United States Patent
Saggar et al.

(10) Patent No.: US 11,818,729 B2
(45) Date of Patent: Nov. 14, 2023

(54) REPORTING ON LEAN SYNCHRONIZATION SIGNAL BLOCKS TO ENABLE BEAM MANAGEMENT

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/476,386

(22) Filed: Sep. 15, 2021

(65) Prior Publication Data

US 2022/0095361 A1    Mar. 24, 2022

Related U.S. Application Data

(60) Provisional application No. 63/081,195, filed on Sep. 21, 2020.

(51) Int. Cl.
| | |
|---|---|
| *H04W 72/10* | (2009.01) |
| *H04W 24/10* | (2009.01) |
| *H04L 5/00* | (2006.01) |
| *H04W 72/23* | (2023.01) |

(52) U.S. Cl.
CPC ........... *H04W 72/23* (2023.01); *H04L 5/0048* (2013.01); *H04W 24/10* (2013.01)

(58) Field of Classification Search
CPC ...... H04W 72/23; H04W 24/10; H04L 5/0048
See application file for complete search history.

(56) References Cited

U.S. PATENT DOCUMENTS

| | | |
|---|---|---|
| 2021/0258895 A1 | 8/2021 | Sakhnini et al. |
| 2021/0376894 A1 | 12/2021 | Cha et al. |
| 2022/0078735 A1* | 3/2022 | Saggar .................. H04B 7/0695 |

FOREIGN PATENT DOCUMENTS

| | | |
|---|---|---|
| WO | 2020091576 A1 | 5/2020 |
| WO | 2021162829 A1 | 8/2021 |

OTHER PUBLICATIONS

International Search Report and Written Opinion—PCT/US2021/050666—ISA/EPO—dated Jan. 5, 2022.
(Continued)

*Primary Examiner* — Ronald B Abelson
(74) *Attorney, Agent, or Firm* — Procopio, Cory, Hargreaves & Savitch LLP

(57) ABSTRACT

A user equipment (UE) may receive at least one lean synchronization signal block (SSB), each of the at least one lean SSB being received in one of at least one symbol and each of the at least one lean SSB including the same kind of synchronization signal in each of the at least one symbol from a base station, measure at least one quantity associated with the received at least one lean SSB, and transmit a measurement report indicating the measured at least one quantity associated with the received at least one lean SSB to the base station for the purpose of beam management. The UE may receive a configuration indicating a lean SSB resource set. The UE may also receive an instruction to activate/deactivate or trigger the lean SSB and the measurement associated with the received lean SSB resource set when the type is semi-persistent or aperiodic, respectively.

30 Claims, 11 Drawing Sheets

(56) References Cited

OTHER PUBLICATIONS

Qualcomm Incorporated: "UE Complexity Reduction for NR RedCap Devices", 3GPP TSG-RAN WG1 Meeting #102, 3GPP Draft, R1-2006811, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, 19 Pages, Aug. 8, 2020 (Aug. 8, 2020), XP051918261, Retrieved from the Internet: URL: https://ftp.3gpp.org/tsg_ran/WG1_RL1/TSGR1_102-e/Docs/R1-0006911.zip retrieved on Aug. 8, 2020] section 3.1.2; p. 11 / 19.

* cited by examiner

REPORTING ON LEAN SYNCHRONIZATION SIGNAL BLOCKS TO ENABLE BEAM MANAGEMENT

CROSS REFERENCE TO RELATED APPLICATION(S)

This application claims the benefit of and priority to U.S. Provisional Application Ser. No. 63/081,195, entitled "REPORTING ON LEAN SYNCHRONIZATION SIGNAL BLOCKS TO ENABLE BEAM MANAGEMENT" and filed on Sep. 21, 2020, which is expressly incorporated by reference herein in its entirety.

TECHNICAL FIELD

The present disclosure relates generally to communication systems, and more particularly, to a method of wireless communication including reporting on lean synchronization signal blocks (SSBs) to enable beam management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. A user equipment (UE) may receive at least one lean SSB, each of the at least one lean SSB being received in one of at least one symbol and each of the at least one lean SSB including the same kind of synchronization signal in each of the at least one symbol from a base station, measure at least one quantity associated with the received at least one lean SSB, and transmit a measurement report indicating the measured at least one quantity associated with the received at least one lean SSB to the base station. The UE may receive a configuration indicating a lean SSB resource set. The configuration may also indicate UL resources for transmitting the measurement report to the base station. The configuration may be received via a radio resource control (RRC) message. The UE may also receive activation/deactivation or triggering of the configured lean SSB resource set via a media access control (MAC) control element (CE) (MAC-CE) or downlink control information (DCI) when the lean SSB is semi-persistent or aperiodic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
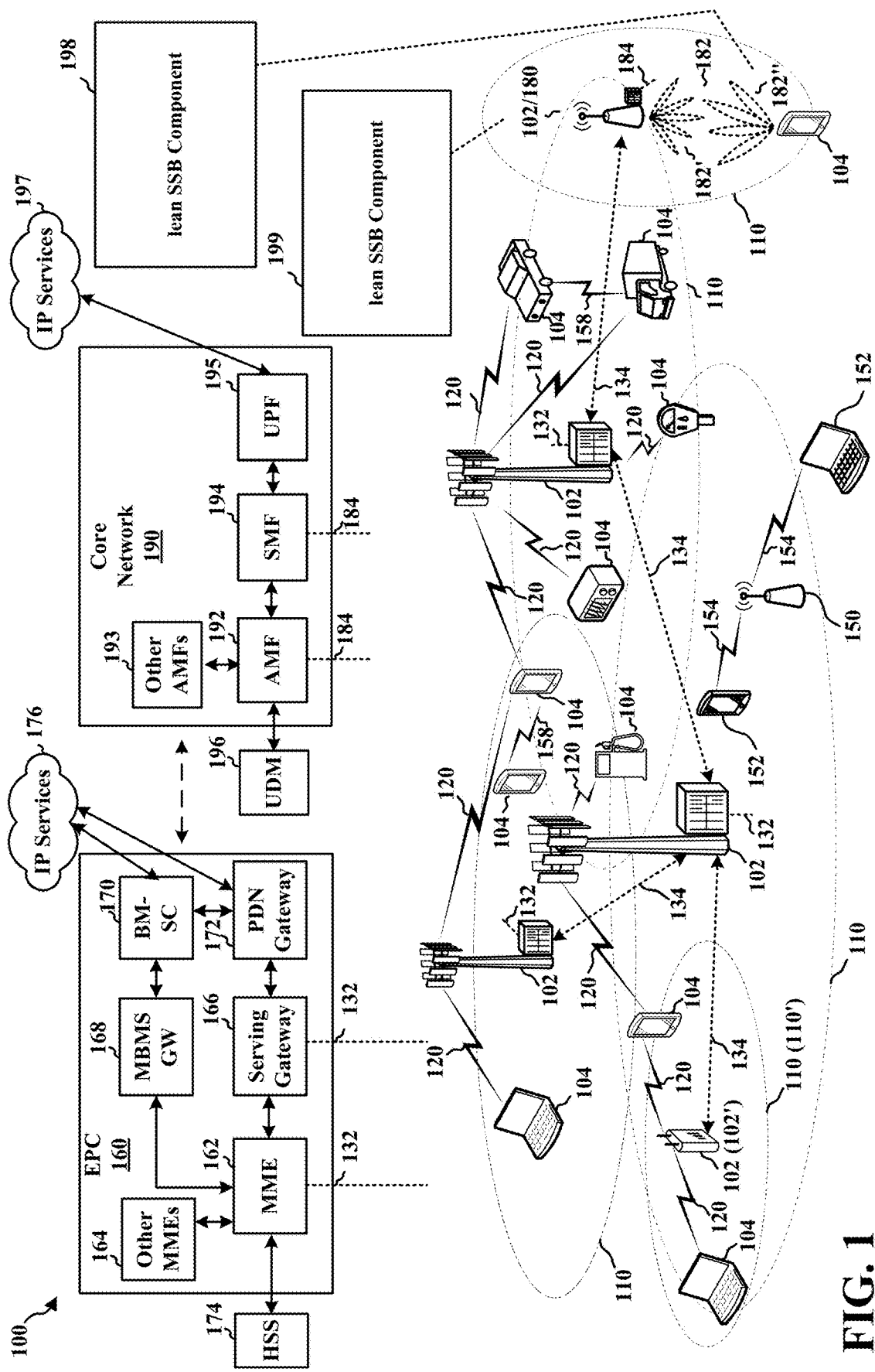
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR 2-2, FR4, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a lean SSB component 198 configured to receive, from a base station, at least one lean SSB, each of the at least one lean SSB being received in one of at least one symbol and each of the at least one lean SSB including a same kind of synchronization signal in each of the at least one symbol, measure at least one quantity associated with the received at least one lean SSB, and transmit, to the base station, a measurement report indicating the measured at least one quantity associated with the received at least one lean SSB. In certain aspects, the base station 180 may include a lean SSB component 199 configured to transmit, to a UE, at least one lean SSB, each of the at least one lean SSB being transmitted in one of at least one symbol and each of the at least one lean SSB including a same kind of synchronization signal in each of the at least one symbol, and receive, from the UE, a measurement report indicating a measurement of the at least one quantity associated with the transmitted at least one lean SSB. Although the following description may be focused on 5G NR, the concepts described herein may be applicable to other similar areas, such as LTE, LTE-A, CDMA, GSM, and other wireless technologies."

Figure 2:
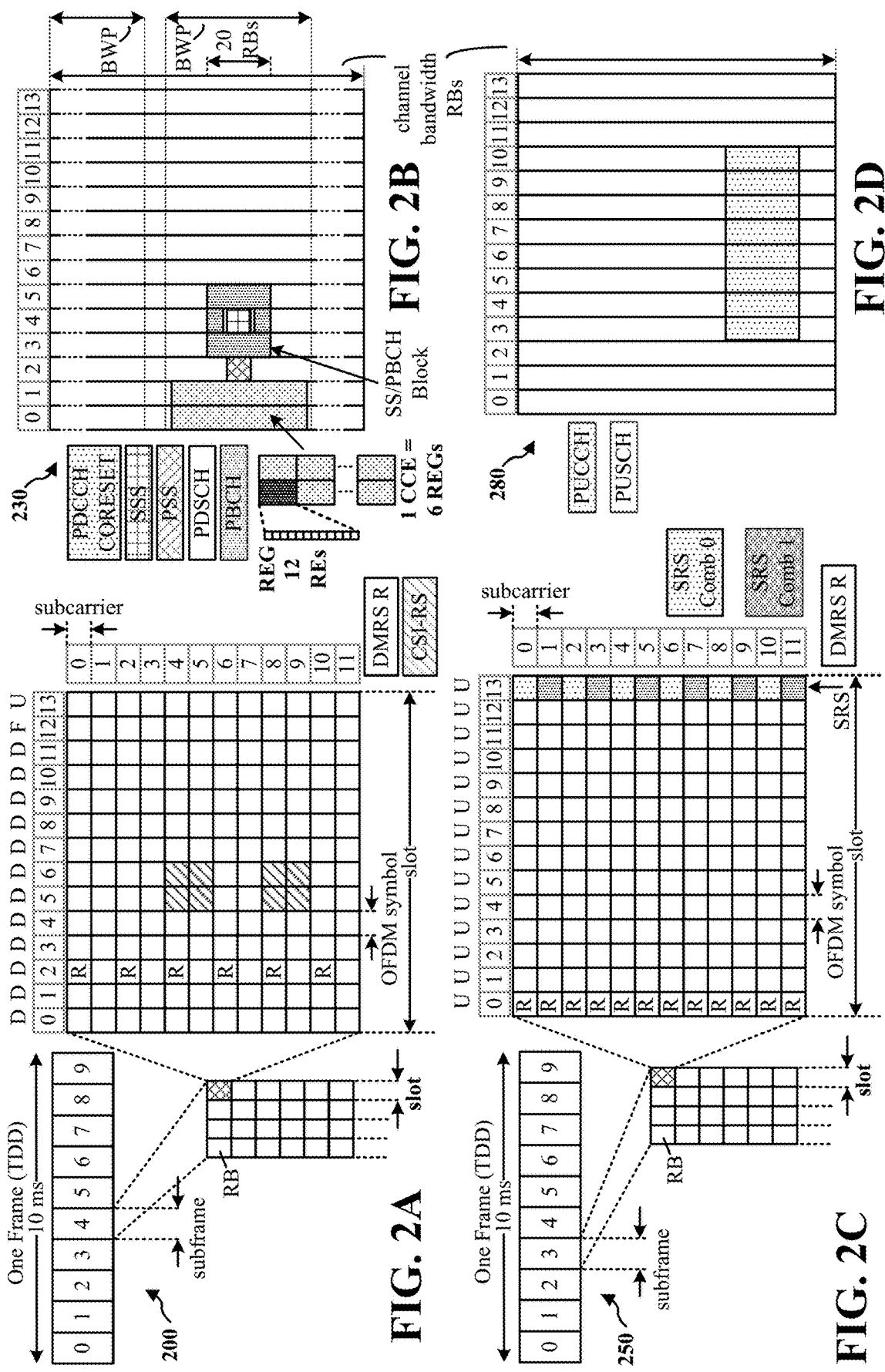
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
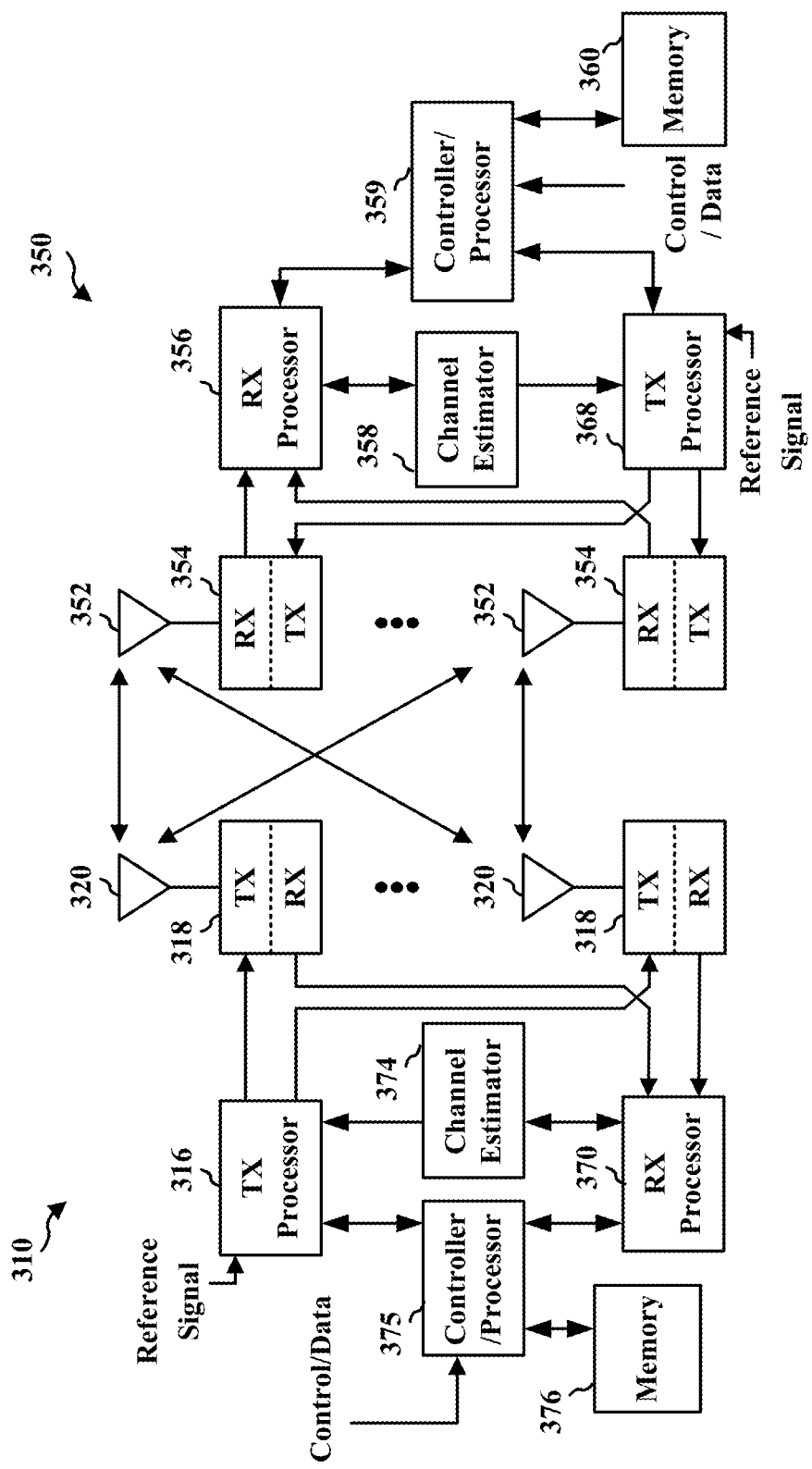
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

A reduced capability (RedCap) device (e.g., a low tier UE, a New Radio (NR)-light UE, etc.) may operate with one or more of a reduced transmit power, a reduced number of transmit and/or receive antennas, a reduced transmit/receive bandwidth, or reduced computational complexity. For example, the RedCap device may be a smart wearable device, an industrial sensor, a video surveillance device, etc. The RedCap devices generally may have lower device cost and complexity compared to high-end enhanced Mobile Broadband (eMBB) or Ultra-Reliable and Low Latency Communications (URLLC) devices, smaller device size such as device design with compact form factor, or specific deployment scenarios including system supporting all frequency range 1 (FR1) and frequency range 2 (FR2) bands for frequency division duplex (FDD) and time division duplex (TDD). For example, a RedCap device may include industrial wireless sensors configured to monitor and communicate with a central server with uplink communication, video surveillance cameras that rely heavily on uplink transmission with low latency and high reliability, or wearable devices with limited size and battery power.

In some aspects, a signaling overhead may be reduced to accommodate the RedCap devices. The reduced signaling overhead may reduce the complexity of the RedCap devices because the RedCap devices may decode less data and control. Therefore, the RedCap devices may have a reduced capability.

A synchronization signal block (SSB) contains reference signals for time-frequency synchronization for initial access and beam management. That is, the SSB is an always-on signal that may include a PSS and an SSS, and PBCH. Initially, the SSB may be used for time-frequency synchronization, and after the initial configuration, the SSB may be used for beam management. However, the SSB may cause signaling overhead. After the time-frequency synchronization during the initial access process, a lean SSB may be introduced to reduce SSB bandwidth and support beam management and/or time-frequency tracking functionality for the RedCap devices. The lean SSB may be a PSS or an SSS in a single symbol, the PSS or the SSS being associated with one transmit beam direction from the base station. In one aspect, gaps may be allocated on either side of the lean SSB. Each lean SSB may be transmitted in a lean SSB resource of a single symbol, and a lean SSB resource set may be configured by the base station for transmitting a set of lean SSBs to the UE. Each lean SSB of the set of lean SSBs in the same lean SSB resource set may have the same kind of synchronization signal, e.g., one of the PSS or the SSS.

For example, the lean SSB may be for a beam management signal rather than the initial access. Accordingly, the RedCap devices may reduce power consumption and conserve computational resources by reducing its operating bandwidth (e.g., compared to an operating bandwidth associated with monitoring traditional SSBs). The base station may configure a same kind of reference signals in the lean SSB, and the UE may measure the reference signals and send a report back to the base station. That is, the base station may configure the lean SSB to include a synchronization signal including one of the PSS or the SSS.

In some aspects, the UE may receive the lean SSB for beam adaptation and the UE may generate and send reports to the base station to enable such beam adaptation procedures. The UE may generate and send reports based on the lean SSB in a similar manner as other reference signals, such as CSI-RS and SSB in 5G NR. A new report and/or resource structures may enable the lean SSB based beam management. That is, to perform the beam management based on the lean SSB, the UE may measure and generate reports of the lean SSB.

For example, the base station may transmit three types of reference signals to the UE, including the SSB, the CSI-RS, and a CSI interference measurement (CSI-IM), that are used for measurements and reporting back by the UE to the base station. That is, the base station may send reference signals including the SSB, the CSI-RS, and the CSI-IM to the UE, and the UE may measure the reference signals from the base station and send the corresponding report indicating the measurement to the base station. For example, the SSB may be used during initial access to obtain a cell ID, a master information block (MIB), and for time-frequency synchronization purposes. The SSB may also be used for beamforming decisions, such as transmitted inside a single SSB burst or with multiple SSBs (e.g., up to 64 for millimeter wave (mmW) frequencies), with each of the SSBs using a different transmission beam. For another example, the CSI-RS may be sent by the base station to the UE on-demand to measure a reference signal received power (RSRP) or a signal-to-interference plus noise ratio (SINR) for beam adaptation purposes. For yet another example, the base station may instruct the UE to perform an interference measurement by sending the CSI-IM signal. The UE may measure the interference based on the CSI-IM received from the base station and send the report to the base station.

The base station and the UE may be configured to send a CSI report for any of the three reference signals (e.g., the SSB, the CSI-RS, and the CSI-IM). A configuration for the CSI report may include at least one of a set of quantities to be reported to the base station, a downlink resource or a resource set to be used for measurements to infer the quantities and/or format of the report. For example, the set of quantities to be reported to the base station may include CSI-related quantities including a channel quality indicator (CQI), a precoding matrix indicator (PMI), a CSI-RS resource indicator (CRI), an SS/PBCH block resource indicator (SSBRI), a layer indicator (LI), a rank indicator (RI), and/or L1 RSRP related quantities including a L1 RSRP (L1-RSRP), and/or a L1 SINR (L1-SINR).

For example, the downlink resource or resource set used for measurements which may be used to infer the reported quantities may also include a non-zero-power (NZP) CSI resource set (NZP-CSI-RS) and/or a SSB-resource set (SSB-RS) for beam management and a CSI-IM-resource set (CSI-IM-RS) for interference management. For example, a configuration may indicate to the UE to generate the CSI report based on 4 beams for aperiodic CSI-RS. For yet another example, the format of the actual report may include a type (e.g., periodic, aperiodic, semi-persistent), a frequency (i.e., how often the synchronization signal repeats), and/or a physical channel to use to send the report to the base station, etc. The example of the CSI report structure may be represented by Table I as provided below.

TABLE I

Example of CSI report structure

| Parameter | Purpose | Values |
| --- | --- | --- |
| Reported Quantity | CSI Related | CQI (Channel Quality Indicator), PMI (Precoding Matrix Indicator), CRI (CSI-RS Resource Indicator), SSBRI (SS/PBCH Block Resource Indicator), LI (Layer Indicator), RI (Rank Indicator) |
| | L1-RSRP related | L1-RSRP, L1-SINR |
| CSI Resource | Beam management Interference Management | NZP-CSI-Resource Set SSB-Resource Set CSI-IM-Resource Set |
| Report Parameters | Type, frequency, etc. | Type = {periodic, aperiodic, SemiPersistentonPUCCH, SemiPersistentonPUSCH}, . . . |

For example, the set of possible reported quantities may include 'none,' 'CSI-RS Resource Index (CRI)-RI-PMI-CQI (CRI-RI-PMI-CQI), CRI-RI-i1,' 'CRI-RI-i1-CQI,' 'CRI-RI-CQI,' 'CRI-RSRP,' 'CRI-SINR,' 'SSB-Index-RSRP,' 'SSB-Index-SINR,' and 'CRI-RI-LI-PMI-CQI.' Regarding the report parameters, the periodic CSI reports may be sent via a periodically assigned PUCCH. The semi-persistent CSI reports may be sent via a periodically assigned PUCCH or a semi-persistently assigned PUSCH. Aperiodic reports may be sent on a scheduled PUSCH that is triggered by the base station using DCI or a MAC-CE.

A configuration may be provided to establish a reporting structure with the lean SSB resource set. That is, aspects of the present disclosure may define a report structure for reporting, to the base station, the lean SSB resource set for beam management purposes.

In some aspects, the resource for transmitting the report and reported quantities associated with the reports may be provided to enable measurement with a lean SSB resource set. In some aspects, these reported quantities may be computed by the symbols connected to specific transmission and reception beams in the lean SSB. In some aspects, the relations between the type of report (i.e., periodic, aperiodic, semi-persistent) and the type of the lean SSB may be defined.

In some aspects, the base station may configure the UE to send the report with physical layer (e.g., L1) measurements taken on the lean SSB. That is, the base station may configure the UE to take the L1 measurements of the lean SSB, and send a report of the L1 measurements to the base station. For the purposes of the report, the base station may inform the UE about the quantity or the set of quantities to be reported, a lean SSB resource set to take the measurements with an appropriate configuration, and an uplink resource to send the report including the measurements.

In some aspects, the quantity or the set of quantities to be reported may include newly defined L1 measurements including, but not limited to, an RSRP, a reference signal received quality (RSRQ), a signal-to-noise ratio (SNR), and/or an SINR using the lean SSB. That is, the base station may indicate to the UE to generate one or a set of L1 measurements including the RSRP, the RSRQ, the SNR, and/or the SINR the lean SSB. For example, the parameters for this configuration may be named 'leanssb-Index-RSRP,' 'leanssb-Index-RSRQ,' 'leanssb-Index-SNR,' and/or 'leanssb-Index-SINR' for the RSRP, the RSRQ, the SNR, and/or the SINR, respectively. The base station may indicate, in the report configuration, which quantity or set of quantities to report. That is, the base station may instruct the UE to report a quantity or a set of quantities using the report configuration. The base station may use the received report to perform beam management in the downlink. The base station may change its transmit beam such as by choosing a narrower or wider beam or by switching the beam, and/or change the parameters of downlink transmission such as modulation and coding rate, in order to improve the link performance.

In one aspect, the lean SSB resource set may be associated with multiple beams, the one or a set of L1 measurements may be generated on more than one beam associated with the lean SSB resource set, and the report may include beam index associated with each beam's measurement, such as RSRP, SINR, etc.

Figure 4:
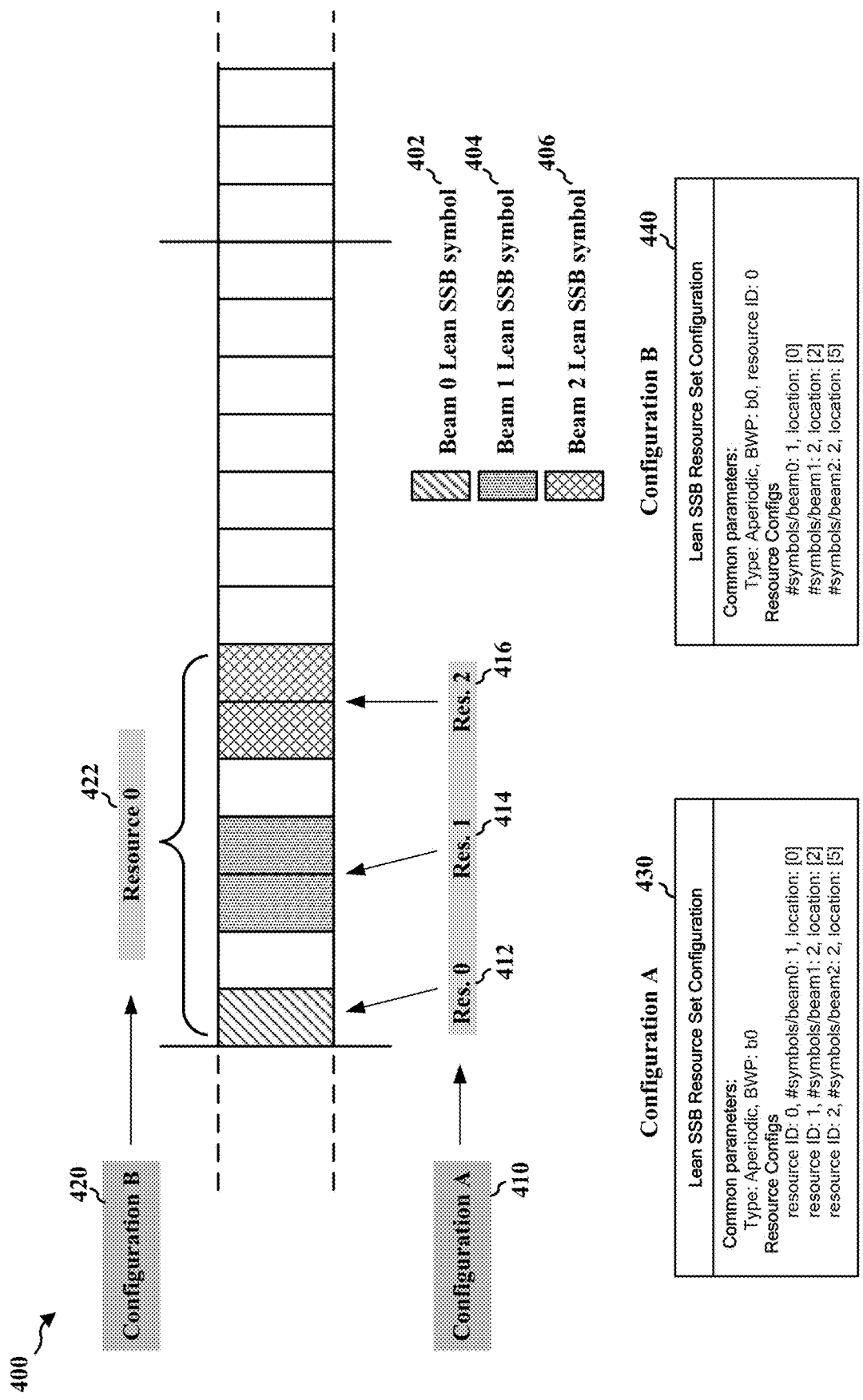
FIG. 4 illustrates an example of a lean SSB configuration of wireless communication.

FIG. 4 illustrates an example of a lean SSB configuration 400 of wireless communication. The lean SSB may include at least one symbol, and each of the at least one symbol may include a synchronization signal. For example, the base station may configure a first lean SSB symbol 402 associated with a first beam (i.e., beam 0), a second lean SSB symbol 404 associated with a second beam (i.e., beam 1), and a third lean SSB symbol 406 associated with a third beam (i.e., beam 2).

In some aspects, each lean SSB in the lean SSB resource set may be tied to at least one base station transmission beam. In one aspect, each lean SSB may correspond to one base station transmission beam. That is, the lean SSB resource set may include one or more lean SSBs or one or more lean SSB symbols. Multiple lean SSB symbols may be configured per transmission beam to enable the UE to perform certain functions (e.g., an Rx beam sweep or to obtain an improved frequency synchronization, etc.). When multiple lean SSB symbols are configured for multiple transmission beams, the same kind of synchronization signal may have the same sequence beamformed differently per each of the multiple transmission beams. Furthermore, the base station may choose different roots of the sequences of the synchronization signal for each serving cell, and the same kind of synchronization signal may have the different sequences per serving cells that may carry the lean SSB resource set. For example, the base station may configure a configuration A for lean SSB resource set 410 including a lean SSB resource zero 412, a lean SSB resource one 414, and a lean SSB resource two 416. The lean SSB resource zero 412 may include one first lean SSB symbol 402 starting at location 0 of the slot. The lean SSB resource one 414 may include two second lean SSB symbols 404 starting at location 2 of the slot. The lean SSB resource two 416 may include two third lean SSB symbol 406 starting at location 5 of the slot. Accordingly, a configuration for the lean SSB resource set 430 from the base station to the UE may include common parameters of all resources, for example, aperiodic type and b0 BWP, and also include resource configurations including 'resource ID: 0, #symbols/beam0: 1, location: [0]' indicating the lean SSB resource zero 412, 'resource ID: 1, #symbols/beam1: 2 location: [2]' indicating the lean SSB resource one 414, and 'resource ID: 2, #symbols/beam2: 2, location: [5]' indicating the lean SSB resource two 416.

In another aspect, one lean SSB resource may include lean SSB symbols tied to multiple base station transmission beams. Each Tx beam may have multiple symbols to enable the UE to perform certain functions (e.g., Rx beam sweep or to obtain an improved frequency synchronization, etc.). For example, the base station may configure a configuration B for lean SSB resource set 420 including a lean SSB resource zero 422, include one first lean SSB symbol 402 starting at location 0 of the slot, two second lean SSB symbols 404 starting at location 2 of the slot, and two third lean SSB symbol 406 starting at location 5 of the slot. Accordingly, a configuration for the lean SSB resource set 440 from the base station to the UE may include common parameters of the resource, for example, aperiodic type, b0 BWP, and resource ID 0, and also include resource configurations including '#symbols/beam0: 1, location: [0]' indicating the one first lean SSB symbol 402 starting at location 0 of the slot, '#symbols/beam1: 2 location: [2]' indicating the two second lean SSB symbols 404 starting at location 2 of the slot, and '#symbols/beam2: 2, location: [5]' indicating the two third lean SSB symbol 406 starting at location 5 of the slot.

In some aspects, the base station may inform the UE of the lean SSB configuration which includes the at least one parameter including resource ID, type, bandwidth part (BWP), serving cell ID(s), and other parameters. The resource ID may be configured for each lean SSB resource, with a unique resource ID to indicate each of the lean SSB resources.

The lean SSB configuration may indicate the type of the lean SSB resources, such as periodic, aperiodic, or semi-persistent. The semi-persistent lean SSB resources may refer to periodic lean SSB resources that may be activated or deactivated through lower layer (e.g., L1 layer or MAC layer) signaling. If the resource type is periodic, the base station may configure the resources via RRC message. If the resource type is aperiodic, the base station may trigger the resources using DCI signaling, and additionally using the MAC-CE. If the resource type is semi-persistent, the base station may configure the resource via RRC signaling and activate or deactivate the resources using the MAC-CE or the DCI signaling.

The lean SSB configuration may indicate in which BWP the resource will be presented or provided. The lean SSB configuration may indicate the serving cell ID(s) that may transmit the lean SSB resource. The lean SSB configuration may include zero, one, or more cell IDs specified to the UE to indicate which cells are transmitting the resource. If the configuration includes no serving cell ID, the UE may implicitly assume that the resources are on the same serving cell as of the received lean SSB configuration.

The lean SSB configuration may include repetition indicating whether a resource has repeated symbols for the UE, for example, to perform Rx beam sweep or refinement. The lean SSB configuration may also include other parameters, such as a location of the at least one resource in the lean SSB resource set, symbol and slot offsets of the lean SSB resource set, a periodicity of the at least one resource of the lean SSB resource set, or time density and time repetition values for an aperiodic lean SSB resource set.

In some aspects, the L1 report (e.g., L1-RSRP, L1-RSRQ, L1-SINR, or L1-SNR) sent by the UE may contain measurements for each resource in the resource set as configured by the base station. The L1 report may include a resource ID or index and a corresponding value of the reported quantity in appropriate units. When similar quantities are reported for multiple resources (e.g., L1-SINR), the values may be specified independently or relatively.

In one aspect, each value may be reported independently. That is, an absolute value or the quantized value of each value may be reported. For example, as illustrated in Table II-A, the absolute value in dB may be reported for each resource index of the lean SSB resource set. In another aspect, each value may be reported in relation to values on other resources. For example, as illustrated in Table II-B, an absolute value may be reported for the resource index 0, and a relative value in relation to the value of the resource index 0 may be reported for other resource indexes. When multiple beams are provided per lean SSB resource set, values may be reported independent or relative to other values in the same resource. For example, as illustrated in Table TI-C, the absolute value in dB may be reported for each resource index of the lean SSB resource set associated with different beams. For another example, as illustrated in Table II-D, an absolute value may be reported for the first beam for each resource index, and relative values in relation to the first beam of the corresponding resource index may be reported for other beams.

TABLE II-A

| Resource Index | Absolute value (dB) |
| --- | --- |
| 0 | 30 |
| 1 | 20 |
| 2 | 10 |
| 3 | 5 |

TABLE II-B

| Resource Index | Relative value (dB) |
| --- | --- |
| 0 | 30 |
| 1 | −10 |
| 2 | −20 |
| 3 | −25 |

TABLE II-C

| Resource Index | Absolute value (dB) |
| --- | --- |
| 0 (Beam 0) | 30 |
| 0 (Beam 1) | 20 |
| 1 (Beam 2) | 20 |
| 1 (Beam 3) | 5 |

TABLE II-D

| Resource Index | Relative value (dB) |
| --- | --- |
| 0 (Beam 0) | 30 |
| 0 (Beam 1) | −10 |
| 1 (Beam 2) | 20 |
| 1 (Beam 3) | −15 |

In some aspects, the L1 report values reported by the UE may be quantized and truncated to a maximum number of bits to reduce overhead. That is, the UE may quantize the values in the L1 report or truncate at least a portion of the values in the L1 report to reduce the signaling overhead. For example, the UE may transmit the largest value in the reports of L1-SINR or L1-RSRP and skip other values in order to further reduce the signaling overhead.

Table III illustrates the type of reports that may be associated with each resource type.

TABLE III

| Resource Report | Resource type and supported report type | | |
| --- | --- | --- | --- |
| | periodic lean SSB | semi-persistent lean SSB | aperiodic lean SSB |
| periodic report | Supported using PUCCH, no dynamic triggering/activation | Not supported | Not supported |
| semi-persistent report | Supported using PUCCH via MAC-CE or PUSCH via DCI | Supported using PUCCH via MAC-CE or PUSCH via DCI | Not supported |
| aperiodic report | Supported using PUSCH via DCI, additionally via MAC-CE | Supported using PUSCH via DCI, additionally via MAC-CE | Supported using PUSCH via DCI, additionally via MAC-CE |

The lean SSB may be received periodically, and the L1 report may be a periodic L1 report periodically transmitted in the PUCCH. The lean SSB may be received periodically, and the semi-persistent L1 report for the periodic lean SSB may be activated to be transmitted in the PUCCH via the MAC-CE or the PUSCH via the DCI. The lean SSB may be received semi-persistently, and a semi-persistent L1 report for the semi-persistent lean SSB may be activated to be transmitted in the PUCCH via the MAC-CE or the PUSCH via the DCI. The lean SSB may be received periodically, and an aperiodic L1 report for the periodic lean SSB may be triggered to be transmitted in the PUSCH via at least one of the DCI or the MAC-CE. The lean SSB may be received semi-persistently, and an aperiodic L1 report for the semi-persistent lean SSB may be triggered to be transmitted in the PUSCH via at least one of the DCI or the MAC-CE. The lean SSB may be received aperiodically, and an aperiodic L report for the aperiodic lean SSB may be triggered to be transmitted in the PUSCH via at least one of the DCI or the MAC-CE.

Figure 5:
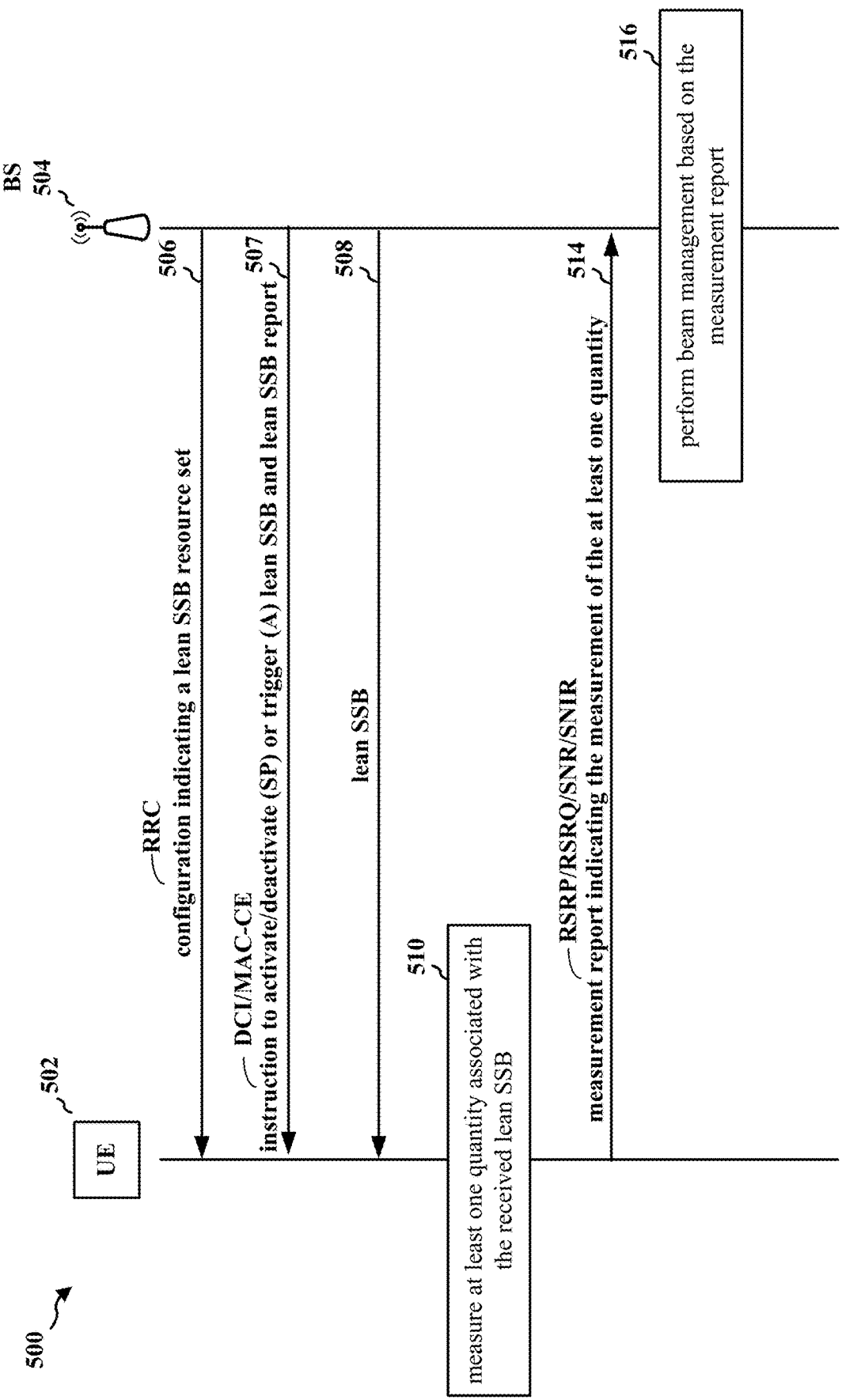
FIG. 5 is a call-flow diagram of wireless communication.

FIG. 5 is a call-flow diagram 500 of wireless communication. The call-flow diagram 500 may include a UE 502 and a base station 504. The base station 504 may configure the UE 502 with lean SSB resource set and instruct the UE 502 to activate, deactivate, or trigger at least one lean SSB or lean SSB report. The UE 502 may measure the lean SSB and report the measurement to the base station 504. The base station 504 may perform beam management based on the measurement report received from the UE 502.

At 506, the UE 502 may receive, from the base station 504, a configuration indicating a lean SSB resource set indicating at least one resource for receiving the lean SSB and for measuring the at least one quantity associated with the received lean SSB resource set. The lean SSB resource set may indicate at least one SSB resource for receiving the lean SSB and for measuring the at least one quantity associated with the received lean SSB resource set. The configuration may indicate the at least one quantity to measure, where the at least one quantity may be measured based on the received configuration. The configuration may indicate UL resources for transmitting the measurement report, where the measurement report is transmitted in the indicated UL resources. The configuration may indicate a resource ID associated with each lean SSB resource in the lean SSB resource set, where the UE 502 may receive and measure the lean SSB resource set based on the received configuration. The configuration may indicate a type of the at least one lean SSB resource in the lean SSB resource set, where the type of the at least one lean SSB resource includes one of periodic, aperiodic, or semi-persistent. The configuration received via an RRC message may be applied for the periodic lean SSB. The configuration may indicate the BWP for receiving at least one lean SSB resource and measuring the at least one quantity associated with the received lean SSB, and the UE 502 may receive and measure the lean SSB based on the received configuration. In one aspect, the configuration may indicate at least one serving cell ID from which the lean SSB is received and measured, and the UE 502 may receive and measure the lean SSB based on the received configuration. In another aspect, the UE 502 may transmit the measurement report to the base station via the serving cell. The configuration may indicate a repetition of the symbol of the lean SSB resource. The configuration may further indicate one or more parameters including a location of at least one resource in the lean SSB resource set, one or more symbol and slot offsets of the lean SSB resource set, a periodicity of the at least one resource of the lean SSB resource set, or one or more time-density and time repetition values for an aperiodic lean SSB resource set.

At 507, the UE 502 may receive, from the base station 504, an instruction to activate/deactivate or trigger the lean SSB resources configured based on the configuration received at 506. In one aspect, the base station 504 may configure a set of the lean SSB resources via the RRC messages at 506 and transmit the instruction via the DCI or the MAC-CE to semi-persistently activate/deactivate the lean SSB resources and/or the lean SSB report. In another aspect, the base station 504 may transmit the instruction via the DCI or the MAC-CE to aperiodically trigger the lean SSB resources and/or the lean SSB report.

At 508, the UE 502 may receive, from the base station 504, at least one lean SSB, each of the at least one lean SSB being received in one of at least one symbol and each of the at least one lean SSB including a same kind of synchronization signal in each of the at least one symbol. That is, the synchronization signal may include one of a PSS or an SSS. The lean SSB resource set may indicate at least one lean SSB resource including the at least one symbol associated with a same transmit beam direction from the base station, or at least one lean SSB resource associated with a plurality of different transmit beam directions from the base station.

At 510, the UE 502 may measure at least one quantity associated with the received at least one lean SSB received at 508. The measured at least one quantity associated with the received lean SSB may include at least one L1 parameter, and the at least one L1 parameter may include the RSRP, the RSRQ, the SNR, the SINR, etc.

At 514, the UE 502 may transmit, to the base station 504, a measurement report indicating the measured at least one quantity associated with the at least one lean SSB received at 508. The measurement report may include a resource ID associated with a lean SSB resource in which the lean SSB is received, and at least one measurement value associated with the measured at least one quantity. Each of the at least one measurement value may include a value independent or dependent of other measurement values. The measurement report may be transmitted using UL resources indicated by the configuration received at 506. The UE 502 may also truncate the measurement report to a maximum number of bits, and the transmitted measurement report may be the truncated measurement report.

The at least one lean SSB may be received periodically, and the L1 report may be a periodic L1 report periodically transmitted in the PUCCH. The at least one lean SSB may be received periodically, and the semi-persistent L1 report for the periodic lean SSB may be activated to be transmitted in the PUCCH via the MAC-CE or the PUSCH via the DCI. The at least one lean SSB may be received semi-persistently, and a semi-persistent L1 report for the semi-persistent lean SSB may be activated to be transmitted in the PUCCH via the MAC-CE or the PUSCH via the DCI. The at least one lean SSB may be received periodically, and an aperiodic L1 report for the periodic lean SSB may be triggered to be transmitted in the PUSCH via at least one of the DCI or the MAC-CE. The at least one lean SSB may be received semi-persistently, and an aperiodic L1 report for the semi-persistent lean SSB may be triggered to be transmitted in the PUSCH via at least one of the DCI or the MAC-CE. The at least one lean SSB may be received aperiodically, and an aperiodic L1 report for the aperiodic lean SSB may be triggered to be transmitted in the PUSCH via at least one of the DCI or the MAC-CE.

At 516, the base station 504 may perform the beam management based on the measurement report transmitted from the UE 502 at 514. That is, the base station 504 may use the measurement report based on the at least one lean SSB to switch/adapt its beams for improved performance.

Figure 6:
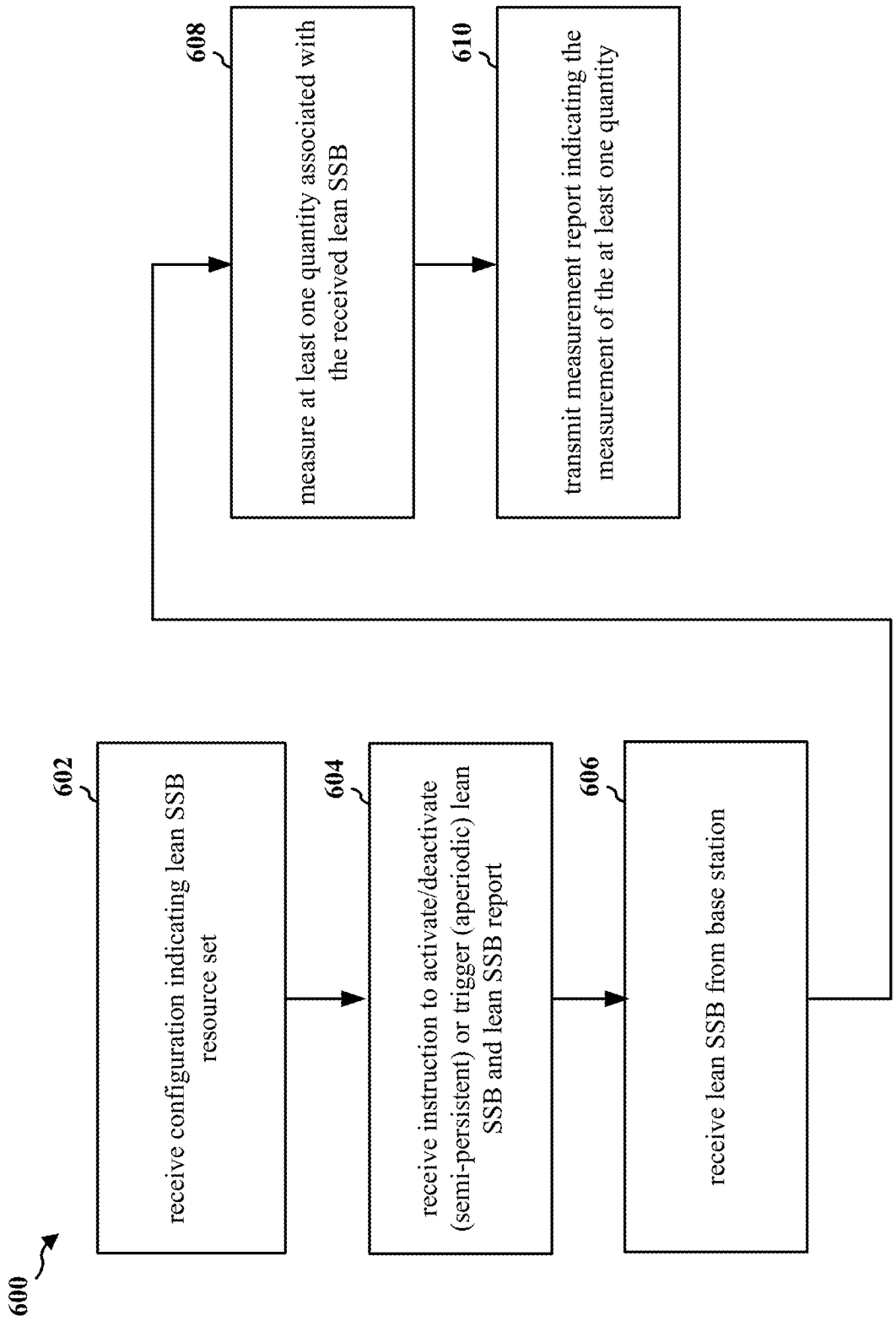
FIG. 6 is a flowchart of a method of wireless communication.

FIG. 6 is a flowchart 600 of a method of wireless communication. The method may be performed by a UE (e.g., the UE 104, 502; the apparatus 1002). The UE may receive, from a base station, a configuration of lean SSB resource set and/or lean SSB report and an instruction to activate, deactivate, or trigger the at least one lean SSB or lean SSB report. The UE may measure the at least one lean SSB and report the measurement to the base station for the base station to perform the management.

At 602, the UE may receive, from the base station, a configuration indicating a lean SSB resource set indicating at least one resource for receiving the at least one lean SSB and for measuring the at least one quantity associated with the received lean SSB resource set. The lean SSB resource set may indicate at least one SSB resource for receiving the lean SSB and for measuring the at least one quantity associated with the received lean SSB resource set. The configuration may indicate the at least one quantity to measure, where the at least one quantity may be measured based on the received configuration. The configuration may indicate UL resources for transmitting the measurement report, where the measurement report is transmitted in the indicated UL resources. The configuration may indicate a resource ID associated with each lean SSB resource in the lean SSB resource set, where the UE may receive and measure the lean SSB resource set based on the received configuration. The configuration may indicate a type of the at least one lean SSB resource in the lean SSB resource set, where the type of the at least one lean SSB resource includes one of periodic, aperiodic, or semi-persistent. The configuration received via an RRC message may be applied for the periodic lean SSB. The configuration may indicate the BWP for receiving at least one lean SSB resource and measuring the at least one quantity associated with the received lean SSB, and the UE may receive and measure the lean SSB based on the received configuration. In one aspect, the configuration may indicate at least one serving cell ID from which the lean SSB is received and measured, and the UE may receive and measure the lean SSB based on the received configuration. In another aspect, the UE may transmit the measurement report to the base station via the serving cell. The configuration may indicate a repetition of the symbol of the lean SSB resource. The configuration may further indicate one or more parameters including a location of at least one resource in the lean SSB resource set, one or more symbol and slot offsets of the lean SSB resource set, a periodicity of the at least one resource of the lean SSB resource set, or one or more time-density and time repetition values for an aperiodic lean SSB resource set. For example, at 506, the UE 502 may receive, from the base station 504, a configuration indicating a lean SSB resource set indicating at least one resource for receiving the lean SSB and for measuring the at least one quantity associated with the received lean SSB resource set. Furthermore, 602 may be performed by a lean SSB configuration component 1040.

At 604, the UE may receive, from the base station, an instruction to activate/deactivate or trigger the lean SSB resources configured based on the configuration received at 602. In one aspect, the UE may receive, at 602, a configuration of a set of the lean SSB resources via the RRC messages, and receive the instruction via the DCI or the MAC-CE to semi-persistently activate/deactivate the lean SSB resources and/or the lean SSB report. In another aspect, the UE may receive the instruction via the DCI or the MAC-CE to aperiodically trigger the lean SSB resources and/or the lean SSB report. For example, at 507, the UE 502 may receive, from the base station 504, an instruction to activate/deactivate or trigger the lean SSB resources configured based on the configuration received at 506. Furthermore, 604 may be performed by a lean SSB configuration component 1040.

At 606, the UE may receive, from the base station, at least one lean SSB, each of the at least one lean SSB being received in one of at least one symbol and each of the at least one lean SSB including a same kind of synchronization signal in each of the at least one symbol. That is, the synchronization signal may include one of a PSS or an SSS. The lean SSB resource set may indicate at least one lean SSB resource including the at least one symbol associated with a same transmit beam direction from the base station, or at least one lean SSB resource associated with a plurality of different transmit beam directions from the base station. For example, at 508, the UE 502 may receive, from the base station 504, at least one lean SSB, each of the at least one lean SSB being received in one of at least one symbol and each of the at least one lean SSB including a same kind of synchronization signal in each of the at least one symbol. Furthermore, 606 may be performed by a lean SSB component 1042.

At 608, the UE may measure at least one quantity associated with the at least one lean SSB received at 606. The measured at least one quantity associated with the received lean SSB may include at least one L1 parameter, and the at least one L1 parameter may include the RSRP, the RSRQ, the SNR, the SINR, etc. For example, at 510, the UE 502 may measure at least one quantity associated with the at least one lean SSB received at 508. Furthermore, 608 may be performed by a lean SSB measuring component 1044.

At 610, the UE may transmit, to the base station, a measurement report indicating the measured at least one quantity associated with the at least one lean SSB received at 606. The measurement report may include a resource ID associated with a lean SSB resource in which the lean SSB is received, and at least one measurement value associated with the measured at least one quantity. Each of the at least one measurement value may include a value independent or dependent of other measurement values. The measurement report may be transmitted using UL resources indicated by the configuration received at 602. The UE may also truncate the measurement report to a maximum number of bits, and the transmitted measurement report may be the truncated measurement report. For example, at 514, the UE 502 may transmit, to the base station 504, a measurement report indicating the measured at least one quantity associated with the at least one lean SSB received at 508. Furthermore, 610 may be performed by a measurement reporting component 1046.

The lean SSB may be received periodically, and the L1 report may be a periodic L1 report periodically transmitted in the PUCCH. The lean SSB may be received periodically, and the semi-persistent L1 report for the periodic lean SSB may be activated to be transmitted in the PUCCH via the MAC-CE or the PUSCH via the DCI. The lean SSB may be received semi-persistently, and a semi-persistent L1 report for the semi-persistent lean SSB may be activated to be transmitted in the PUCCH via the MAC-CE or the PUSCH via the DCI. The lean SSB may be received periodically, and an aperiodic L1 report for the periodic lean SSB may be triggered to be transmitted in the PUSCH via at least one of the DCI or the MAC-CE. The lean SSB may be received semi-persistently, and an aperiodic L1 report for the semi-persistent lean SSB may be triggered to be transmitted in the PUSCH via at least one of the DCI or the MAC-CE. The lean SSB may be received aperiodically, and an aperiodic L1 report for the aperiodic lean SSB may be triggered to be transmitted in the PUSCH via at least one of the DCI or the MAC-CE.

Figure 7:
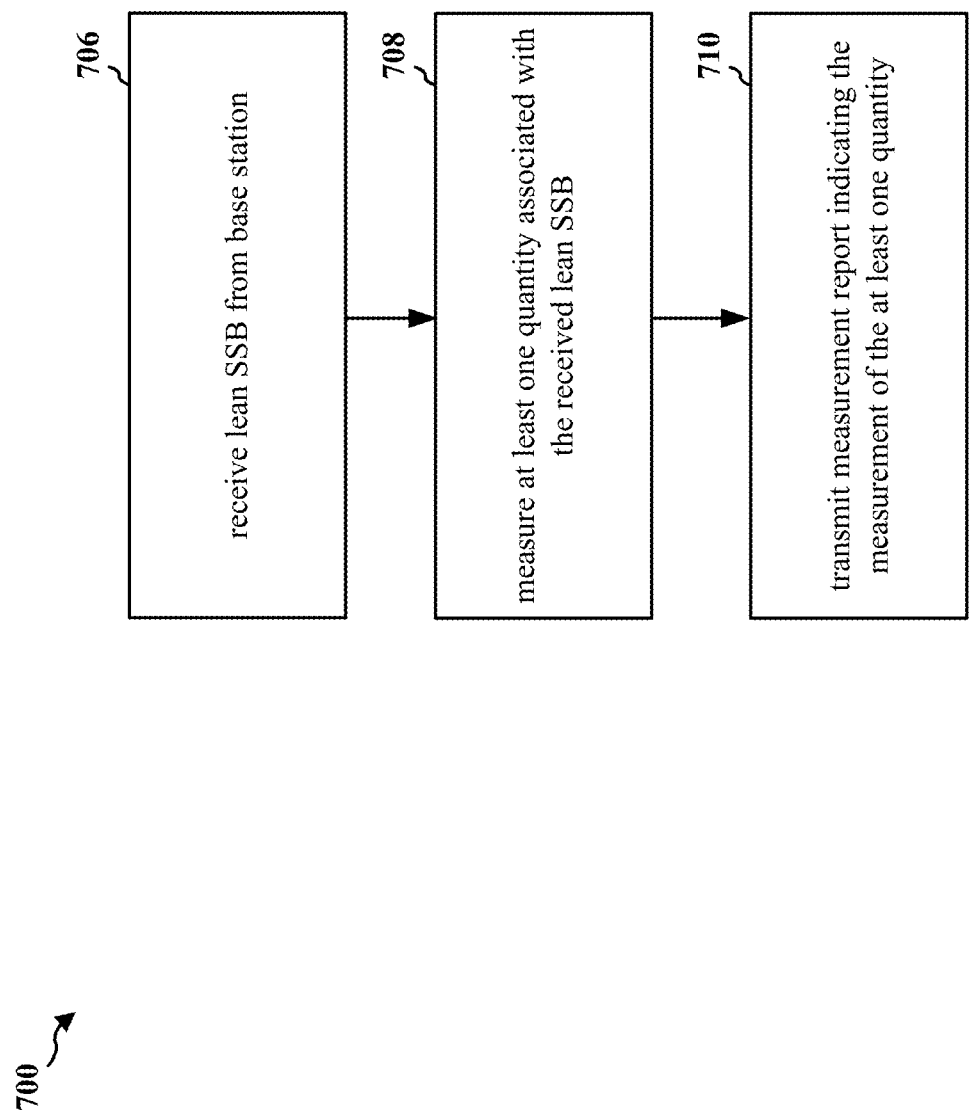
FIG. 7 is a flowchart of a method of wireless communication.

FIG. 7 is a flowchart 700 of a method of wireless communication. The method may be performed by a UE (e.g., the UE 104, 502; the apparatus 1002). The UE may receive, from a base station, a configuration of lean SSB resource set or lean SSB report and an instruction to activate, deactivate, or trigger the at least one lean SSB and lean SSB report. The UE may measure the at least one lean SSB and report the measurement to the base station for the base station to perform the management.

At 706, the UE may receive, from the base station, at least one lean SSB, each of the at least one lean SSB being received in one of at least one symbol and each of the at least one lean SSB including a same kind of synchronization signal in each of the at least one symbol. That is, the synchronization signal may include one of a PSS or an SSS. The lean SSB resource set may indicate at least one lean SSB resource including the at least one symbol associated with a same transmit beam direction from the base station, or at least one lean SSB resource associated with a plurality of different transmit beam directions from the base station. For example, at 508, the UE 502 may receive, from the base station 504, at least one lean SSB, each of the at least one lean SSB being received in one of at least one symbol and each of the at least one lean SSB including a same kind of synchronization signal in each of the at least one symbol. Furthermore, 706 may be performed by a lean SSB component 1042.

At 708, the UE may measure at least one quantity associated with the at least one lean SSB received at 706. The measured at least one quantity associated with the received lean SSB may include at least one L1 parameter, and the at least one L1 parameter may include the RSRP, the RSRQ, the SNR, the SINR, etc. For example, at 510, the UE 502 may measure at least one quantity associated with the at least one lean SSB received at 508. Furthermore, 708 may be performed by a lean SSB measuring component 1044.

At 710, the UE may transmit, to the base station, a measurement report indicating the measured at least one quantity associated with the at least one lean SSB received at 706. The measurement report may include a resource ID associated with a lean SSB resource in which the lean SSB is received, and at least one measurement value associated with the measured at least one quantity. Each of the at least one measurement value may include a value independent or dependent of other measurement values. The measurement report may be transmitted using UL resources indicated by the received configuration. The UE may also truncate the measurement report to a maximum number of bits, and the transmitted measurement report may be the truncated measurement report. For example, at 514, the UE 502 may transmit, to the base station 504, a measurement report indicating the measured at least one quantity associated with the at least one lean SSB received at 508. Furthermore, 710 may be performed by a measurement reporting component 1046.

The lean SSB may be received periodically, and the L1 report may be a periodic L1 report periodically transmitted in the PUCCH. The lean SSB may be received periodically, and the semi-persistent L1 report for the periodic lean SSB may be activated to be transmitted in the PUCCH via the MAC-CE or the PUSCH via the DCI. The lean SSB may be received semi-persistently, and a semi-persistent L1 report for the semi-persistent lean SSB may be activated to be transmitted in the PUCCH via the MAC-CE or the PUSCH via the DCI. The lean SSB may be received periodically, and an aperiodic L1 report for the periodic lean SSB may be triggered to be transmitted in the PUSCH via at least one of the DCI or the MAC-CE. The lean SSB may be received semi-persistently, and an aperiodic L1 report for the semi-persistent lean SSB may be triggered to be transmitted in the PUSCH via at least one of the DCI or the MAC-CE. The lean SSB may be received aperiodically, and an aperiodic L1 report for the aperiodic lean SSB may be triggered to be transmitted in the PUSCH via at least one of the DCI or the MAC-CE.

Figure 8:
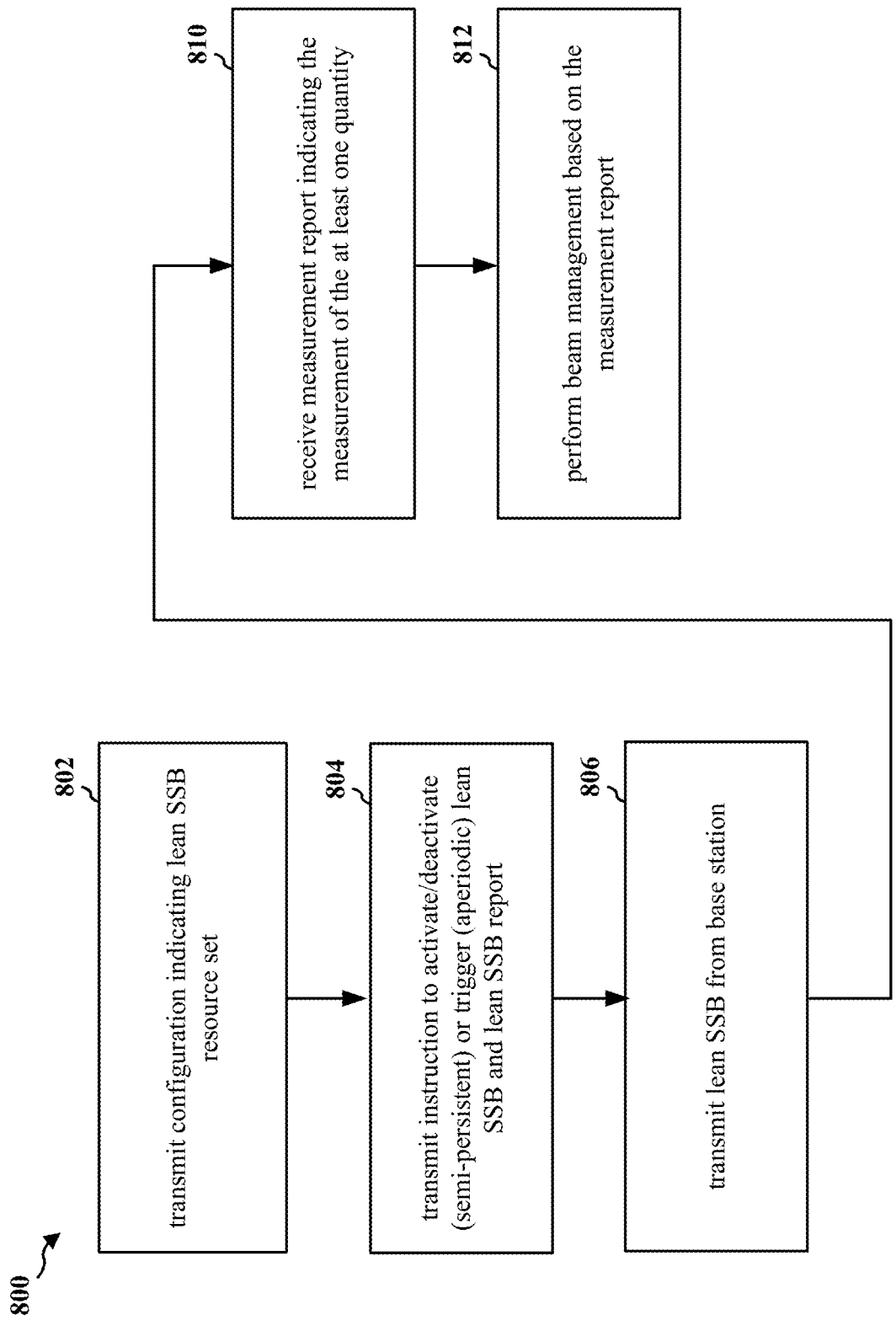
FIG. 8 is a flowchart of a method of wireless communication.

FIG. 8 is a flowchart 800 of a method of wireless communication. The method may be performed by a base station (e.g., the base station 102/180, 504; the apparatus 1102). The base station may configure a UE with lean SSB resource set and instruct the UE to activate, deactivate, or trigger the at least one lean SSB or lean SSB report. The base station may receive measurement of the at least one lean SSB from the UE and perform beam management based on the measurement report received from the UE.

At 802, the base station may transmit, to the UE, a configuration indicating a lean SSB resource set indicating at least one resource for receiving the at least one lean SSB and for measuring the at least one quantity associated with the received lean SSB resource set. The lean SSB resource set may indicate at least one SSB resource for the UE to receive the lean SSB and measure the at least one quantity associated with the received lean SSB resource set. The configuration may indicate the at least one quantity to measure, where the at least one quantity may be measured based on the received configuration. The configuration may indicate UL resources for the UE to transmit the measurement report, where the measurement report is received in the indicated UL resources. The configuration may indicate a resource ID associated with each lean SSB resource in the lean SSB resource set, where the base station may transmit the lean SSB resource set based on the received configuration. The configuration may indicate a type of the at least one lean SSB resource in the lean SSB resource set, where the type of the at least one lean SSB resource includes one of periodic, aperiodic, or semi-persistent. The configuration transmitted via an RRC message may be applied for the periodic lean SSB. The configuration may indicate the BWP for receiving at least one lean SSB resource and measuring the at least one quantity associated with the received lean SSB, and the base station may transmit the lean SSB based on the received configuration. In one aspect, the configuration may indicate at least one serving cell ID from which the lean SSB is transmitted, and the base station may transmit the lean SSB based on the received configuration. In another aspect, the base station may receive the measurement report to the base station via the serving cell. The configuration may indicate a repetition of the symbol of the lean SSB resource. The configuration may further indicate one or more parameters including a location of at least one resource in the lean SSB resource set, one or more symbol and slot offsets of the lean SSB resource set, a periodicity of the at least one resource of the lean SSB resource set, or one or more time-density and time repetition values for an aperiodic lean SSB resource set. For example, at 506, the base station 504 may transmit, to the UE 502, a configuration indicating a lean SSB resource set indicating at least one resource for receiving the lean SSB and for measuring the at least one quantity associated with the received lean SSB resource set. Furthermore, 802 may be performed by a lean SSB configuration component 1140.

At 804, the base station may transmit, to the UE, an instruction to activate/deactivate or trigger the lean SSB resources configured based on the configuration received at 802. In one aspect, the base station may configure, at 802, a set of the lean SSB resources via the RRC messages, and transmit the instruction via the DCI or the MAC-CE to semi-persistently activate/deactivate the lean SSB resources and/or the lean SSB report. In another aspect, the base station may transmit the instruction via the DCI or the MAC-CE to aperiodically trigger the lean SSB resources and/or the lean SSB report. For example, at 507, the base station 504 may transmit, to the UE 502, an instruction to activate/deactivate or trigger the lean SSB resources configured based on the configuration received at 506. Furthermore, 804 may be performed by a lean SSB configuration component 1140.

At 806, the base station may transmit, to the UE, at least one lean SSB, each of the at least one lean SSB being transmitted in one of at least one symbol and each of the at least one lean SSB including a same kind of synchronization signal in each of the at least one symbol. That is, the synchronization signal may include one of a PSS or an SSS. The lean SSB resource set may indicate at least one lean SSB resource including the at least one symbol associated with a same transmit beam direction from the base station, or at least one lean SSB resource associated with a plurality of different transmit beam directions from the base station. For example, at 508, the base station 504 may transmit, to the UE 502, at least one lean SSB, each of the at least one lean SSB being transmitted in one of at least one symbol and each of the at least one lean SSB including a same kind of synchronization signal in each of the at least one symbol. Furthermore, 806 may be performed by a lean SSB component 1142.

At 810, the base station may receive, from the UE, a measurement report indicating measured at least one quantity associated with the at least one lean SSB transmitted at 806. The measurement report may include a resource ID associated with a lean SSB resource in which the lean SSB is received, and at least one measurement value associated with the measured at least one quantity. Each of the at least one measurement value may include a value independent or dependent of other measurement values. The measurement report may be transmitted using UL resources indicated by the configuration received at 802. For example, at 514, the base station 504 may receive, from the UE 502, a measurement report indicating measured at least one quantity associated with the at least one lean SSB received at 508. Furthermore, 810 may be performed by a measurement reporting component 1146.

The lean SSB may be received periodically, and the L1 report may be a periodic L1 report periodically transmitted in the PUCCH. The lean SSB may be received periodically, and the semi-persistent L1 report for the periodic lean SSB may be activated to be transmitted in the PUCCH via the MAC-CE or the PUSCH via the DCI. The lean SSB may be received semi-persistently, and a semi-persistent L1 report for the semi-persistent lean SSB may be activated to be transmitted in the PUCCH via the MAC-CE or the PUSCH via the DCI. The lean SSB may be received periodically, and an aperiodic L1 report for the periodic lean SSB may be triggered to be transmitted in the PUSCH via at least one of the DCI or the MAC-CE. The lean SSB may be received semi-persistently, and an aperiodic L1 report for the semi-persistent lean SSB may be triggered to be transmitted in the PUSCH via at least one of the DCI or the MAC-CE. The lean SSB may be received aperiodically, and an aperiodic L1 report for the aperiodic lean SSB may be triggered to be transmitted in the PUSCH via at least one of the DCI or the MAC-CE.

At 812, the base station may perform the beam management based on the measurement report received from the UE at 810. That is, the base station may use the measurement report based on the lean SSB to switch/adapt its beams for improved performance. For example, at 516, the base station 504 may perform the beam management based on the measurement report transmitted from the UE 502 at 514. Furthermore, 812 may be performed by a beam managing component 1148.

Figure 9:
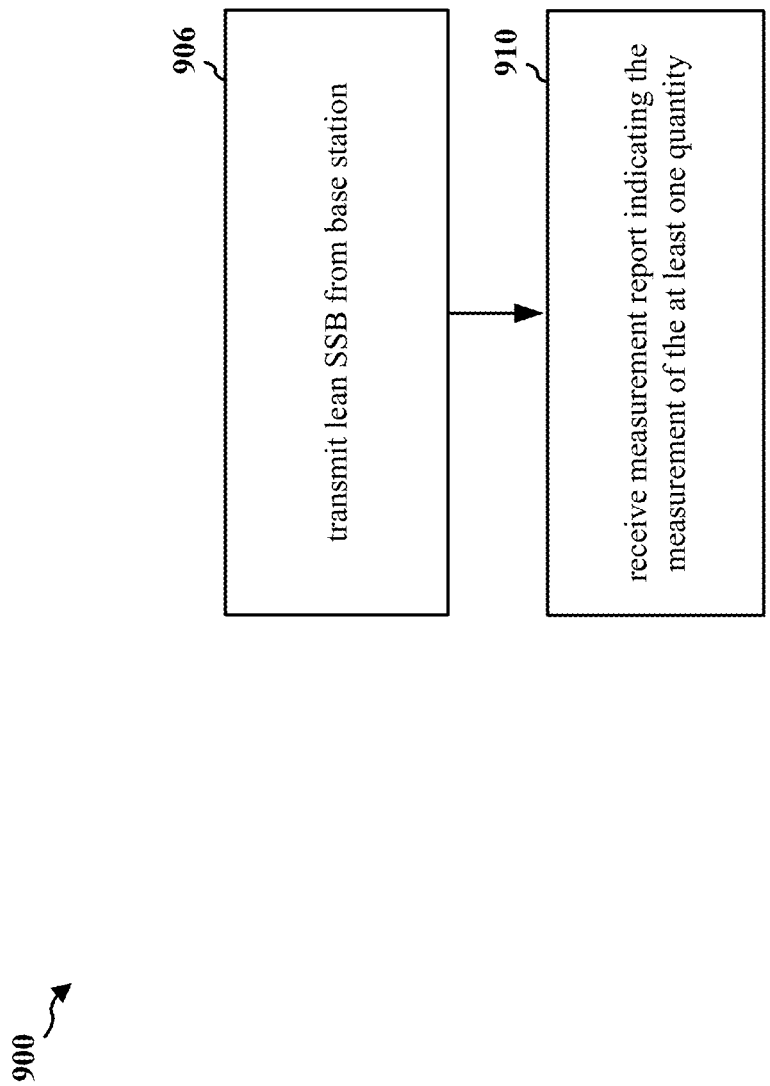
FIG. 9 is a flowchart of a method of wireless communication.

FIG. 9 is a flowchart 900 of a method of wireless communication. The method may be performed by a base station (e.g., the base station 102/180, 504; the apparatus 1102). The base station may configure a UE with lean SSB resource set and instruct the UE to activate, deactivate, or trigger the at least one lean SSB or lean SSB report. The base station may receive measurement of the at least one lean SSB from the UE and perform beam management based on the measurement report received from the UE.

At 906, the base station may transmit, to the UE, at least one lean SSB, each of the at least one lean SSB being transmitted in one of at least one symbol and each of the at least one lean SSB including a same kind of synchronization signal in each of the at least one symbol. That is, the synchronization signal may include one of a PSS or an SSS. The lean SSB resource set may indicate at least one lean SSB resource including the at least one symbol associated with a same transmit beam direction from the base station, or at least one lean SSB resource associated with a plurality of different transmit beam directions from the base station. For example, at 508, the base station 504 may transmit, to the UE 502, at least one lean SSB, each of the at least one lean SSB being transmitted in one of at least one symbol and each of the at least one lean SSB including a same kind of synchronization signal in each of the at least one symbol. Furthermore, 906 may be performed by a lean SSB component 1142.

At 910, the base station may receive, from the UE, a measurement report indicating measured at least one quantity associated with the at least one lean SSB transmitted at 906. The measurement report may include a resource ID associated with a lean SSB resource in which the lean SSB is received, and at least one measurement value associated with the measured at least one quantity. Each of the at least one measurement value may include a value independent or dependent of other measurement values. The measurement report may be transmitted using UL resources indicated by the configuration received. For example, at 514, the base station 504 may receive, from the UE 502, a measurement report indicating measured at least one quantity associated with the at least one lean SSB received at 508. Furthermore, 910 may be performed by a measurement reporting component 1146.

The lean SSB may be received periodically, and the L1 report may be a periodic L1 report periodically transmitted in the PUCCH. The lean SSB may be received periodically, and the semi-persistent L1 report for the periodic lean SSB may be activated to be transmitted in the PUCCH via the MAC-CE or the PUSCH via the DCI. The lean SSB may be received semi-persistently, and a semi-persistent L1 report for the semi-persistent lean SSB may be activated to be transmitted in the PUCCH via the MAC-CE or the PUSCH via the DCI. The lean SSB may be received periodically, and an aperiodic L1 report for the periodic lean SSB may be triggered to be transmitted in the PUSCH via at least one of the DCI or the MAC-CE. The lean SSB may be received semi-persistently, and an aperiodic L1 report for the semi-persistent lean SSB may be triggered to be transmitted in the PUSCH via at least one of the DCI or the MAC-CE. The lean SSB may be received aperiodically, and an aperiodic L1 report for the aperiodic lean SSB may be triggered to be transmitted in the PUSCH via at least one of the DCI or the MAC-CE.

Figure 10:
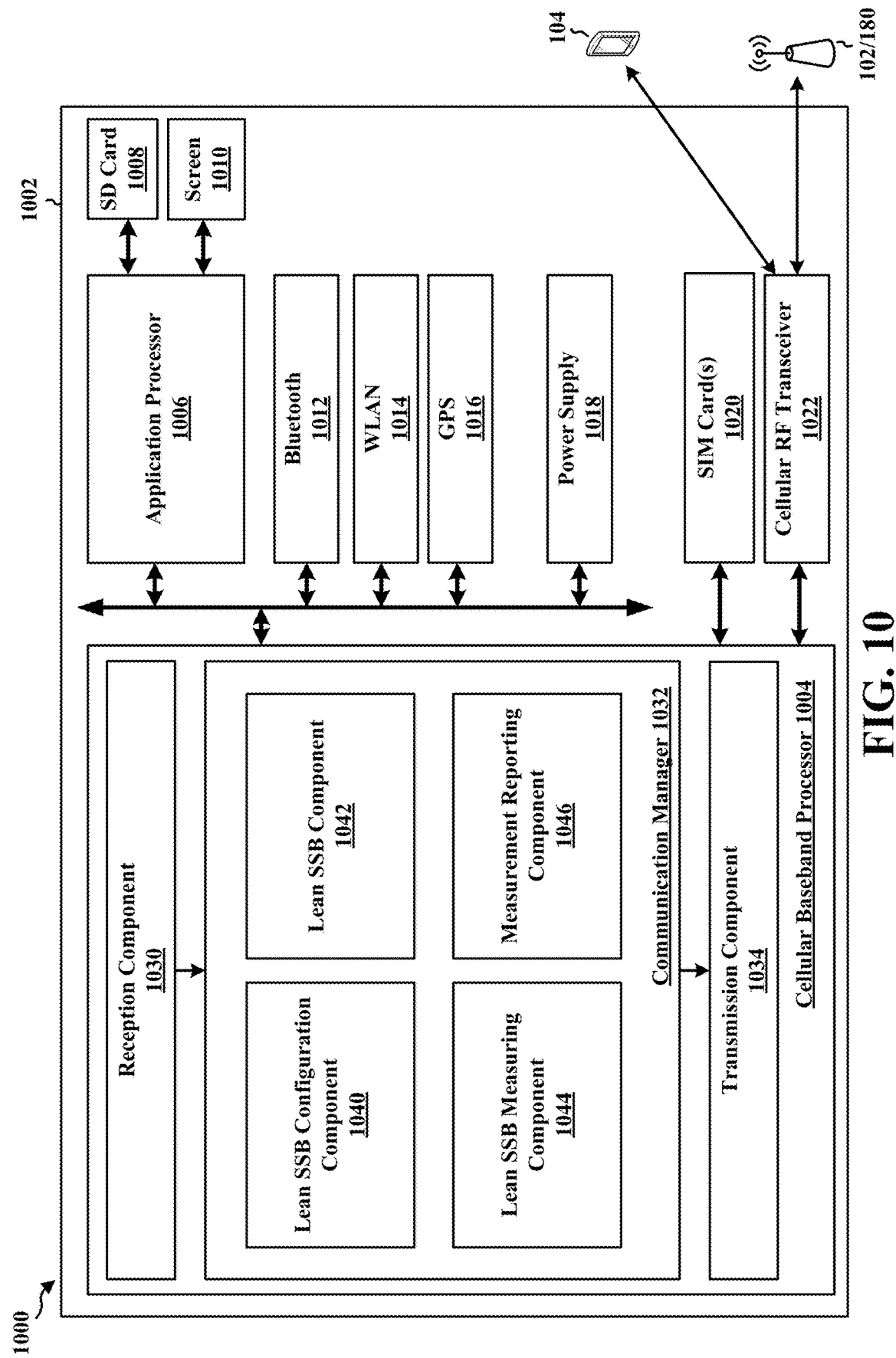
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a lean SSB configuration component 1040 that is configured to receive a configuration indicating a lean SSB resource set indicating at least one resource for receiving the at least one lean SSB and for measuring the at least one quantity associated with the received lean SSB resource set, and receive an instruction to activate/deactivate or trigger the lean SSB resources configured based on the received configuration, e.g., as described in connection with 602 and 604. The communication manager 1032 further includes a lean SSB component 1042 that is configured to receive, from the base station, at least one lean SSB, each of the at least one lean SSB being received in one of at least one symbol and each of the at least one lean SSB including a same kind of synchronization signal in each of the at least one symbol, e.g., as described in connection with 606 and 706. The communication manager 1032 includes a lean SSB measuring component 1044 that is configured to measure at least one quantity associated with the received at least one lean SSB, e.g., as described in connection with 608 and 708. The communication manager 1032 further includes a measurement reporting component 1046 that is configured to transmit a measurement report indicating the measurement of the at least one quantity associated with the received lean SSB, e.g., as described in connection with 610 and 710.

The apparatus may include additional components that perform each of the blocks of the algorithm in the flowcharts of FIGS. 5, 6, and 7. As such, each block in the flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving, from a base station, at least one lean SSB, each of the at least one lean SSB being received in one of at least one symbol and each of the at least one lean SSB including a same kind of synchronization signal in each of the at least one symbol, means for measuring at least one quantity associated with the received at least one lean SSB, and means for transmitting, to the base station, a measurement report indicating the measured at least one quantity associated with the received at least one lean SSB. The apparatus 1002 includes means for receiving, from the base station, a configuration indicating the at least one quantity to measure, where the at least one quantity is measured based on the received configuration, means for receiving, from the base station, a configuration indicating UL resources for transmitting the measurement report, where the measurement report is transmitted in the UL resources and means for receiving, from the base station, a configuration indicating a lean SSB resource set, the lean SSB resource set indicating at least one lean SSB resource for receiving the lean SSB and for measuring the at least one quantity associated with the received lean SSB resource set. The apparatus 1002 also includes means for truncating the measurement report to a maximum number of bits, where the transmitted measurement report is the truncated measurement report. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
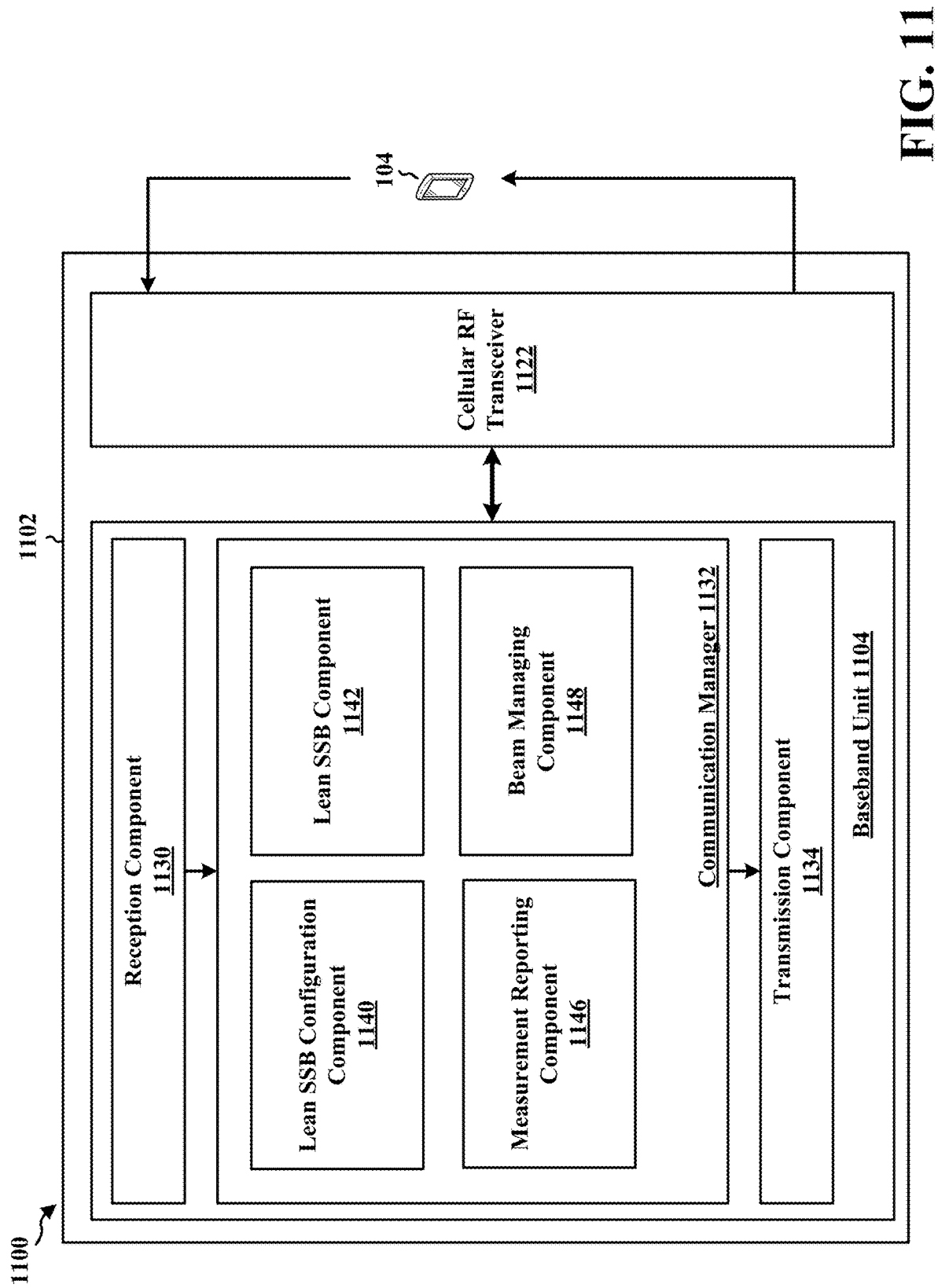
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a lean SSB configuration component 1140 that is configured to transmit a configuration indicating a lean SSB resource set indicating at least one resource for receiving the at least one lean SSB and for measuring the at least one quantity associated with the received lean SSB resource set, and transmit an instruction to activate/deactivate or trigger the lean SSB resources configured based on the received configuration, e.g., as described in connection with 802 and 804. The communication manager 1132 further includes a lean SSB component 1142 that is configured to transmit at least one lean SSB, each of the at least one lean SSB being transmitted in one of at least one symbol and each of the at least one lean SSB including a same kind of synchronization signal in each of the at least one symbol, e.g., as described in connection with 806 and 906. The communication manager 1132 includes a measurement reporting component 1146 that is configured to receive a measurement report indicating measured at least one quantity associated with the transmitted at least one lean SSB, e.g., as described in connection with 810 and 910. The communication manager 1132 further includes a beam managing component 1148 that is configured to perform the beam management based on the measurement report received from the UE, e.g., as described in connection with 812.

The apparatus may include additional components that perform each of the blocks of the algorithm in the flowcharts of FIGS. 5, 8, and 9. As such, each block in the flowcharts of FIGS. 5, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a UE, at least one lean SSB, each of the at least one lean SSB being transmitted in one of at least one symbol and each of the at least one lean SSB including a same kind of synchronization signal in each of the at least one symbol, and means for receiving, from the UE, a measurement report indicating measured at least one quantity associated with the transmitted at least one lean SSB. The apparatus 1102 includes means for transmitting, to the UE, a configuration indicating the at least one quantity to measure, where the at least one quantity is measured based on the transmitted configuration, means for transmitting, to the UE, a configuration indicating UL resources for transmitting the measurement report, where the measurement report is transmitted in the UL resources, and means for transmitting, to the UE, a configuration indicating a lean SSB resource set, the lean SSB resource set indicating at least one lean SSB resource for receiving the lean SSB and for measuring the at least one quantity associated with the transmitted lean SSB resource set. The apparatus 1102 includes means for performing beam management based on the measurement report received from the UE. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

A UE may receive at least one lean SSB, each lean SSB being received in one of at least one symbol and each lean SSB including the same kind of synchronization signal in each of the at least one symbol from a base station, measure at least one quantity associated with the received lean SSB, and transmit a measurement report indicating the measurement of the at least one quantity associated with the received lean SSB to the base station. The synchronization signal may include one of a PSS or a SSS. The lean SSB resource set may indicate at least one lean SSB resource including the at least one symbol associated with a same transmit beam direction from the base station, or at least one lean SSB resource associated with a plurality of different transmit beam directions from the base station. The measured at least one quantity associated with the received lean SSB may include at least one L1 parameter including the RSRP, the RSRQ, the SNR, and the SINR. The UE may receive a configuration indicating a lean SSB resource set. The configuration may indicate the at least one quantity to measure. The configuration may indicate a resource ID associated with each lean SSB resource in the lean SSB resource set, a type of the at least one lean SSB resource in the lean SSB resource set, a BWP for receiving at least one lean SSB resource, at least one service cell ID from which the lean SSB is received and measured, a repetition of the symbol of the lean SSB resource. The configuration may also indicate UL resources for transmitting the measurement report to the base station. The configuration may be received via an RRC message. The UE may also receive an instruction to activate/deactivate or trigger the configured lean SSB resources via a MAC-CE or DCI when the lean SSB is semi-persistent or aperiodic.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a base station, at least one lean SSB, each of the at least one lean SSB being received in one of at least one symbol and each of the at least one lean SSB including a same kind of synchronization signal in each of the at least one symbol, measure at least one quantity associated with the received at least one lean SSB, and transmit, to the base station, a measurement report indicating the measured at least one quantity associated with the received at least one lean SSB.

Aspect 2 is the apparatus of aspect 1, where the synchronization signal includes one of a PSS or an SSS.

Aspect 3 is the apparatus of any of aspects 1 and 2, where the at least one processor and the memory are further configured to receive, from the base station, a configuration indicating the at least one quantity to measure, where the at least one quantity is measured based on the received configuration.

Aspect 4 is the apparatus of any of aspects 1 to 3, where the at least one processor and the memory are further configured to receive, from the base station, a configuration indicating UL resources for transmitting the measurement report, where the measurement report is transmitted in the UL resources.

Aspect 5 is the apparatus of any of aspects 1 to 4, where the measured at least one quantity associated with the received at least one lean SSB includes at least one L1 parameter.

Aspect 6 is the apparatus of aspect 5, where the at least one L1 parameter includes a RSRP, a RSRQ, a SNR, or a SINK.

Aspect 7 is the apparatus of any of aspects 1 to 6, where the at least one processor and the memory are further configured to receive, from the base station, a configuration indicating a lean SSB resource set, the lean SSB resource set indicating at least one lean SSB resource for receiving the at least one lean SSB and for measuring the at least one quantity associated with the lean SSB resource set.

Aspect 8 is the apparatus of aspect 7, where the lean SSB resource set indicates at least one lean SSB resource including the at least one symbol associated with a same transmit beam direction from the base station.

Aspect 9 is the apparatus of any of aspects 7 and 8, where the lean SSB resource set indicates at least one lean SSB resource associated with a plurality of different transmit beam directions from the base station.

Aspect 10 is the apparatus of any of aspects 7 to 9, where the configuration further indicates a resource ID associated with each lean SSB resource in the lean SSB resource set, where the received at least one lean SSB and the measured at least one quantity are based on the received configuration.

Aspect 11 is the apparatus of any of aspects 7 to 10, where the configuration further indicates a type of the at least one lean SSB resource in the lean SSB resource set, where the type of the at least one lean SSB resource includes one of periodic, aperiodic, or semi-persistent.

Aspect 12 is the apparatus of aspect 11, where the configuration is received via a RRC message, the apparatus further including receiving an instruction, via DCI or a MAC-CE, to activate/deactivate or trigger the at least one lean SSB and the measurement associated with the received lean SSB resource set when the type is semi-persistent or aperiodic, respectively, and where the configuration received via the RRC message indicates transmission of the at least one lean SSB and instructs to make the measurement associated with the received lean SSB resource set when the type is periodic.

Aspect 13 is the apparatus of any of aspects 7 to 12, where the configuration further indicates a BWP for receiving at least one lean SSB resource and measuring the at least one quantity associated with the received lean SSB, where the received at least one lean SSB and the measured at least one quantity are based on the received configuration.

Aspect 14 is the apparatus of any of aspects 7 to 13, where the configuration further indicates at least one serving cell ID from which the at least one lean SSB is received and measured, where the received at least one lean SSB and the measured at least one quantity are based on the received configuration.

Aspect 15 is the apparatus of any of aspects 7 to 14, where the configuration further indicates a serving cell to receive the lean SSB resource set and make measurements on the received lean SSB resource set, where the measurement report is transmitted to the serving cell.

Aspect 16 is the apparatus of any of aspects 7 to 15, where the configuration further indicates a repetition of the at least one symbol of the at least one lean SSB resource, where the received at least one lean SSB and the measured at least one quantity are based on the received configuration.

Aspect 17 is the apparatus of any of aspects 7 to 16, where the configuration further indicates one or more parameters including a location of at least one resource in the lean SSB resource set, one or more symbol and slot offsets of the lean SSB resource set, a periodicity of the at least one resource of the lean SSB resource set, or one or more time-density and time repetition values for an aperiodic lean SSB resource set.

Aspect 18 is the apparatus of any of aspects 1 to 17, where the measurement report includes a resource ID associated with at least one lean SSB resource in which the at least one lean SSB is received, and at least one measurement value associated with the at least one quantity.

Aspect 19 is the apparatus of aspect 18, where each of the at least one measurement value includes a value independent of other measurement values.

Aspect 20 is the apparatus of any of aspects 18 and 19, where one or more of the at least one measurement value includes a value dependent on other measurement values.

Aspect 21 is the apparatus of any of aspects 1 to 20, where the at least one processor and the memory are further configured to truncate the measurement report to a maximum number of bits, where the transmitted measurement report is the truncated measurement report.

Aspect 22 is the apparatus of any of aspects 1 to 21, where the at least one lean SSB is received periodically, and the measurement report is a periodic measurement report transmitted in a PUCCH.

Aspect 23 is the apparatus of any of aspects 1 to 22, where the at least one lean SSB is received periodically, and a semi-persistent measurement report for the periodic lean SSB is triggered to be transmitted in a PUCCH via a MAC-CE or a PUSCH via DCI.

Aspect 24 is the apparatus of any of aspects 1 to 23, where the at least one lean SSB is received semi-persistently, and a semi-persistent measurement report for the semi-persistent lean SSB is triggered to be transmitted in a PUCCH via a MAC-CE or a PUSCH via DCI.

Aspect 25 is the apparatus of any of aspects 1 to 24, where the at least one lean SSB is received periodically, and an aperiodic measurement report for the periodic lean SSB is triggered to be transmitted in a PUSCH via at least one of DCI or a MAC-CE.

Aspect 26 is the apparatus of any of aspects 1 to 25, where the at least one lean SSB is received semi-persistently, and an aperiodic measurement report for the semi-persistent lean SSB is triggered to be transmitted in a PUSCH via at least one of DCI or a MAC-CE.

Aspect 27 is the apparatus of any of aspects 1 to 26, where the at least one lean SSB is received aperiodically, and an aperiodic measurement report for the aperiodic lean SSB is triggered to be transmitted in a PUSCH via at least one of DCI or a MAC-CE.

Aspect 28 is a method of wireless communication for implementing any of aspects 1 to 27.

Aspect 29 is an apparatus for wireless communication including means for implementing any of aspects 1 to 27.

Aspect 30 is a computer-readable medium storing computer executable code, where the code when executed by a processor causes the processor to implement any of aspects 1 to 27.

Aspect 31 is an apparatus for wireless communication including at least one processor coupled to a memory and configured to transmit, to a UE, at least one lean SSB, each of the at least one lean SSB being transmitted in one of at least one symbol and each of the at least one lean SSB including a same kind of synchronization signal in each of the at least one symbol, and receive, from the UE, a measurement report indicating the measurement of the at least one quantity associated with the transmitted at least one lean SSB.

Aspect 32 is the apparatus of aspect 31, where the synchronization signal includes one of a PSS or an SSS.

Aspect 33 is the apparatus of any of aspects 31 and 32, where the at least one processor and the memory are further configured to transmit, to the UE, a configuration indicating the at least one quantity to measure, where the at least one quantity is measured based on the transmitted configuration.

Aspect 34 is the apparatus of any of aspects 31 to 33, where the at least one processor and the memory are further configured to transmit, to the UE, a configuration indicating UL resources for transmitting the measurement report, where the measurement report is transmitted in the UL resources.

Aspect 35 is the apparatus of any of aspects 31 to 34, where the at least one quantity associated with the transmitted at least one lean SSB includes at least one L1 parameter.

Aspect 36 is the apparatus of aspect 35, where the at least one L1 parameter includes a RSRP, a RSRQ, a SNR, or a SINR.

Aspect 37 is the apparatus of any of aspects 31 to 36, where the at least one processor and the memory are further configured to transmit, to the UE, a configuration indicating a lean SSB resource set, the lean SSB resource set indicating at least one lean SSB resource for receiving the at least one lean SSB and for measuring the at least one quantity associated with the transmitted at least one lean SSB.

Aspect 38 is the apparatus of aspect 37, where the lean SSB resource set indicates at least one lean SSB resource including the at least one symbol associated with a same transmit beam direction from the base station.

Aspect 39 is the apparatus of any of aspects 37 and 38, where the lean SSB resource set indicates the at least one lean SSB resource associated with a plurality of different transmit beam directions from the base station.

Aspect 40 is the apparatus of any of aspects 37 to 39, where the configuration further indicates a resource ID associated with each lean SSB resource in the lean SSB resource set, where the received at least one lean SSB and the measured at least one quantity are based on the configuration.

Aspect 41 is the apparatus of any of aspects 37 to 40, where the configuration further indicates a type of the at least one lean SSB resource in the lean SSB resource set, where the type of the at least one lean SSB resource includes one of periodic, aperiodic, or semi-persistent.

Aspect 42 is the apparatus of aspect 41, where the configuration is transmitted via a RRC message, the apparatus further including receiving an instruction, via DCI or a MAC-CE, to activate/deactivate or trigger the lean SSB and the measurement associated with the transmitted lean SSB resource set when the type is semi-persistent or aperiodic, respectively, and where the configuration transmitted via the RRC message indicates transmission of the lean SSB and instructs to make the measurement associated with the transmitted lean SSB resource set when the type is periodic.

Aspect 43 is the apparatus of any of aspects 37 to 42, where the configuration further indicates a BWP for receiving the at least one lean SSB resource and measuring the at least one quantity associated with the transmitted at least one lean SSB, where the received at least one lean SSB and the measured at least one quantity are based on the transmitted configuration.

Aspect 44 is the apparatus of any of aspects 37 to 43, where the configuration further indicates, to the UE, at least one serving cell ID from which the at least one lean SSB is received and measured, where the received at least one lean SSB and the measured at least one quantity are based on the transmitted configuration.

Aspect 45 is the apparatus of any of aspects 37 to 44, where the configuration further indicates, to the UE, a serving cell to receive the lean SSB resource set and make measurements on the received lean SSB resource set, where the measurement report is received via the serving cell.

Aspect 46 is the apparatus of any of aspects 37 to 45, where the configuration further indicates a repetition of the symbol of the lean SSB resource, where the received at least one lean SSB and the measured at least one quantity are based on the transmitted configuration.

Aspect 47 is the apparatus of any of aspects 37 to 46, where the configuration further indicates one or more parameters including a location of at least one resource in the lean SSB resource set, one or more symbol and slot offsets of the lean SSB resource set, a periodicity of the at least one resource of the lean SSB resource set, or one or more time-density and time repetition values for an aperiodic lean SSB resource set.

Aspect 48 is the apparatus of any of aspects 31 to 47, where the measurement report includes a resource ID associated with at least one lean SSB resource in which the at least one lean SSB is transmitted, and at least one measurement value associated with the at least one quantity.

Aspect 49 is the apparatus of aspect 48, where each of the at least one measurement value includes a value independent of other measurement values.

Aspect 50 is the apparatus of any of aspects 48 and 49, where one or more of the at least one measurement value includes a value dependent on other measurement values.

Aspect 51 is the apparatus of any of aspects 31 to 50, where the at least one lean SSB is transmitted periodically, and the measurement report is a periodic measurement report received in a PUCCH.

Aspect 52 is the apparatus of any of aspects 31 to 51, where the at least one lean SSB is transmitted periodically, and a semi-persistent measurement report for the periodic lean SSB is received in a PUCCH via a MAC-CE or a PUSCH via DCI.

Aspect 53 is the apparatus of any of aspects 31 to 52, where the at least one lean SSB is transmitted semi-persistently, and a semi-persistent measurement report for the semi-persistent lean SSB is received in a PUCCH via a MAC-CE or a PUSCH via DCI.

Aspect 54 is the apparatus of any of aspects 31 to 53, where the at least one lean SSB is transmitted periodically, and an aperiodic measurement report for the periodic lean SSB is received in a PUSCH via at least one of DCI or a MAC-CE.

Aspect 55 is the apparatus of any of aspects 31 to 54, where the at least one lean SSB is transmitted semi-persistently, and an aperiodic measurement report for the semi-persistent lean SSB is received in a PUSCH via at least one of DCI or a MAC-CE.

Aspect 56 is the apparatus of any of aspects 31 to 55, where the at least one lean SSB is transmitted aperiodically, and an aperiodic measurement report for the aperiodic lean SSB is received in a PUSCH via at least one of DCI or a MAC-CE.

Aspect 57 is the apparatus of any of aspects 31 to 56, where the at least one processor and the memory are further configured to perform beam management based on the measurement report received from the UE.

Aspect 58 is a method of wireless communication for implementing any of aspects 31 to 57.

Aspect 59 is an apparatus for wireless communication including means for implementing any of aspects 31 to 57.

Aspect 60 is a computer-readable medium storing computer executable code, where the code when executed by a processor causes the processor to implement any of aspects 31 to 57.

What is claimed is:

1. An apparatus for wireless communication at a user equipment (UE), comprising:
a memory; and
at least one processor coupled to the memory, the at least one processor configured to:
receive, from a base station, at least one lean synchronization signal block (SSB), each of the at least one lean SSB being received in one of at least one symbol and each of the at least one lean SSB including a same kind of synchronization signal in each of the at least one symbol;
measure at least one quantity associated with the received at least one lean SSB; and
transmit, to the base station, a measurement report indicating the measured at least one quantity associated with the received at least one lean SSB.

2. The apparatus of claim 1, further comprising a transceiver coupled to the at least one processor,
wherein the at least one processor is further configured to receive, from the base station, a configuration indicating the at least one quantity to measure, wherein the at least one quantity is measured based on the received configuration.

3. The apparatus of claim 1, wherein the at least one processor is further configured to receive, from the base station, a configuration indicating uplink (UL) resources for transmitting the measurement report, wherein to transmit the measurement report, the at least one processor is further configured to transmit the measurement report in the UL resources.

4. The apparatus of claim 1, wherein the measured at least one quantity associated with the received at least one lean SSB comprises at least one physical layer (L1) parameter.

5. The apparatus of claim 1, wherein the at least one processor is further configured to receive, from the base station, a configuration indicating a lean SSB resource set, the lean SSB resource set indicating at least one lean SSB resource for receiving the at least one lean SSB and for measuring the at least one quantity associated with the lean SSB resource set.

6. The apparatus of claim 5, wherein the lean SSB resource set indicates the at least one lean SSB resource associated with a plurality of different transmit beam directions from the base station.

7. The apparatus of claim 5, wherein the configuration further indicates a resource identifier (ID) associated with each lean SSB resource in the lean SSB resource set, wherein the received at least one lean SSB and the measured at least one quantity are based on the received configuration.

8. The apparatus of claim 5, wherein the configuration further indicates a type of the at least one lean SSB resource in the lean SSB resource set, wherein the type of the at least one lean SSB resource comprises one of periodic, aperiodic, or semi-persistent.

9. The apparatus of claim 5, wherein the configuration further indicates a bandwidth part (BWP) for receiving the at least one lean SSB resource and measuring the at least one quantity associated with the received at least one lean SSB, wherein the received at least one lean SSB and the measured at least one quantity are based on the received configuration.

10. The apparatus of claim 5, wherein the configuration further indicates at least one serving cell identifier (ID) from which the reception of the at least one lean SSB is based, wherein the received at least one lean SSB and the measured at least one quantity are based on the received configuration.

11. The apparatus of claim 5, wherein the configuration further indicates a repetition of the at least one symbol of the at least one lean SSB resource, wherein the received at least one lean SSB and the measured at least one quantity are based on the received configuration.

12. The apparatus of claim 5, wherein the configuration further indicates one or more parameters including a location of at least one resource in the lean SSB resource set, one or more symbol and slot offsets of the lean SSB resource set, a periodicity of the at least one resource of the lean SSB resource set, or one or more time-density and time repetition values for an aperiodic lean SSB resource set.

13. The apparatus of claim 1, wherein the measurement report comprises a resource identifier (ID) associated with at least one lean SSB resource in which the at least one lean SSB is received, and at least one measurement value associated with the measured at least one quantity.

14. The apparatus of claim 1, wherein the at least one processor is further configured to truncate the measurement report to a maximum number of bits, wherein the transmitted measurement report is the truncated measurement report.

15. An apparatus for wireless communication at a base station, comprising:
a memory; and
at least one processor coupled to the memory, the at least one processor configured to:
transmit, to a user equipment (UE), at least one lean synchronization signal block (SSB), each of the at least one lean SSB being transmitted in one of at least one symbol and each of the at least one lean SSB including a same kind of synchronization signal in each of the at least one symbol; and
receive, from the UE, a measurement report indicating a measurement of at least one quantity associated with the transmitted at least one lean SSB.

16. The apparatus of claim 15, further comprising a transceiver coupled to the at least one processor,
wherein the at least one processor is further configured to transmit, to the UE, a configuration indicating the at least one quantity to measure, wherein the at least one quantity is based on the transmitted configuration.

17. The apparatus of claim 15, wherein the at least one processor is further configured to transmit, to the UE, a configuration indicating uplink (UL) resources for transmitting the measurement report, wherein to receive the measurement report, the at least one processor is configured to receive the measurement report in the UL resources.

18. The apparatus of claim 15, wherein the at least one quantity associated with the transmitted at least one lean SSB comprises at least one physical layer (L1) parameter.

19. The apparatus of claim 15, wherein the at least one processor is further configured to transmit, to the UE, a configuration indicating a lean SSB resource set, the lean SSB resource set indicating at least one lean SSB resource for receiving the at least one lean SSB and for measuring the at least one quantity associated with the transmitted at least one lean SSB.

20. The apparatus of claim 19, wherein the lean SSB resource set indicates the at least one lean SSB resource associated with a plurality of different transmit beam directions from the base station.

21. The apparatus of claim 19, wherein the configuration further indicates a resource identifier (ID) associated with each lean SSB resource in the lean SSB resource set, wherein the receiving the at least one lean SSB and the measuring the at least one quantity are based on the transmitted configuration.

22. The apparatus of claim 19, wherein the configuration further indicates a type of the at least one lean SSB resource in the lean SSB resource set, wherein the type of the at least one lean SSB resource comprises one of periodic, aperiodic, or semi-persistent.

23. The apparatus of claim 19, wherein the configuration further indicates a bandwidth part (BWP) for receiving the at least one lean SSB resource and measuring the at least one quantity associated with the transmitted at least one lean SSB, wherein the receiving the at least one lean SSB and the measuring the at least one quantity are based on the transmitted configuration.

24. The apparatus of claim 19, wherein the configuration further indicates, to the UE, at least one serving cell identifier (ID) from which the receiving the at least one lean SSB is based, wherein the receiving the at least one lean SSB and the measuring the at least one quantity are based on the transmitted configuration.

25. The apparatus of claim 19, wherein the configuration further indicates a repetition of the at least one symbol of the at least one lean SSB resource, wherein the receiving the at least one lean SSB and the measuring the at least one quantity are based on the transmitted configuration.

26. The apparatus of claim 19, wherein the configuration further indicates one or more parameters including a location of at least one resource in the lean SSB resource set, one or more symbol and slot offsets of the lean SSB resource set, a periodicity of the at least one resource of the lean SSB resource set, or one or more time-density and time repetition values for an aperiodic lean SSB resource set.

27. The apparatus of claim 15, wherein the measurement report comprises a resource identifier (ID) associated with at least one lean SSB resource in which the at least one lean SSB is transmitted, and at least one measurement value associated with the at least one quantity.

28. The apparatus of claim 15, wherein the at least one processor is further configured to perform beam management based on the measurement report received from the UE.

29. A method of wireless communication at a user equipment (UE), comprising:
receiving, from a base station, at least one lean synchronization signal block (SSB), each of the at least one lean SSB being received in one of at least one symbol and each of the at least one lean SSB including a same kind of synchronization signal in each of the at least one symbol;
measuring at least one quantity associated with the received at least one lean SSB; and
transmitting, to the base station, a measurement report indicating the measured at least one quantity associated with the received at least one lean SSB.

30. A method of wireless communication at a base station, comprising:
transmitting, to a user equipment (UE), at least one lean synchronization signal block (SSB), each of the at least one lean SSB being transmitted in one of at least one symbol and each of the at least one lean SSB including a same kind of synchronization signal in each of the at least one symbol; and receiving, from the UE, a measurement report indicating a measurement of at least one quantity associated with the transmitted at least one lean SSB.

* * * * *